(12) United States Patent
Davis et al.

(10) Patent No.: US 12,296,557 B2
(45) Date of Patent: *May 13, 2025

(54) LAMINATED VEHICLE GLAZING, ASSOCIATED DEVICE HAVING A NEAR-INFRARED VISION SYSTEM, AND PRODUCTION THEREOF

(71) Applicant: SAINT-GOBAIN GLASS FRANCE, Courbevoie (FR)

(72) Inventors: Claire Davis, Compiegne (FR); Keihann Yavari, Margny-les-Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 377 days.

This patent is subject to a terminal disclaimer.

(21) Appl. No.: 17/790,651

(22) PCT Filed: Dec. 23, 2020

(86) PCT No.: PCT/FR2020/052615
§ 371 (c)(1),
(2) Date: Jul. 1, 2022

(87) PCT Pub. No.: WO2021/136908
PCT Pub. Date: Jul. 8, 2021

(65) Prior Publication Data
US 2023/0038114 A1    Feb. 9, 2023

(30) Foreign Application Priority Data

Jan. 3, 2020  (FR) .................................... 2000023

(51) Int. Cl.
*B32B 17/10*    (2006.01)
*B32B 7/12*    (2006.01)
*B32B 37/12*    (2006.01)

(52) U.S. Cl.
CPC .......... *B32B 17/10036* (2013.01); *B32B 7/12* (2013.01); *B32B 17/1011* (2013.01);
(Continued)

(58) Field of Classification Search
None
See application file for complete search history.

(56) References Cited

U.S. PATENT DOCUMENTS 5,162,046 A    11/1992  Mercado
6,132,882 A    10/2000  Landin et al.
(Continued)

FOREIGN PATENT DOCUMENTS

CN    111409314 A    7/2020
DE    20 2019 103729 U1    7/2019
(Continued)

OTHER PUBLICATIONS

Non-Final Office Action as issued in U.S. Appl. No. 17/790,644, dated Jun. 23, 2023.
(Continued)

*Primary Examiner* — David Sample
(74) *Attorney, Agent, or Firm* — Pillsbury Winthrop Shaw Pittman LLP

(57) ABSTRACT

A vehicle laminated glazing includes a first extraclear glass sheet (exterior glazing), a lamination interlayer and a second glass or plastic sheet (interior glazing) with a traversing hole.

25 Claims, 14 Drawing Sheets

Figure 1:
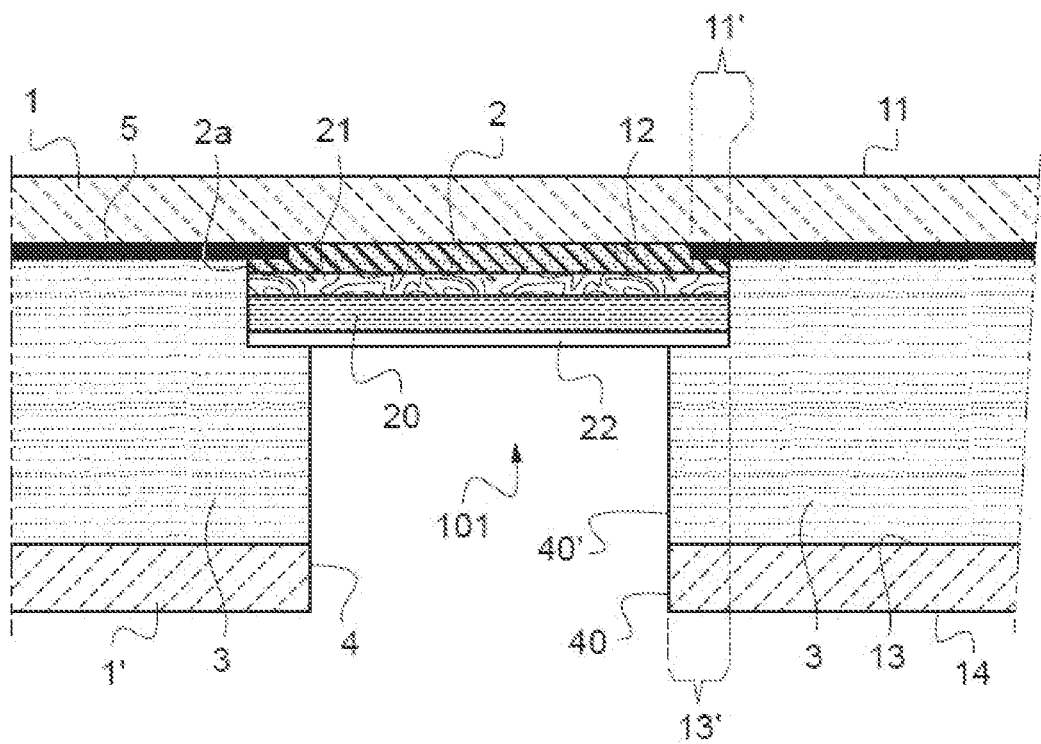

(52) U.S. Cl.
CPC .. *B32B 17/10348* (2013.01); *B32B 17/10385* (2013.01); *B32B 17/10651* (2013.01); *B32B 17/10761* (2013.01); *B32B 37/12* (2013.01); *B32B 2255/10* (2013.01); *B32B 2605/006* (2013.01)

(56) References Cited

U.S. PATENT DOCUMENTS

| | | | |
|---|---|---|---|
| 10,373,731 | B1 | 8/2019 | Wilson et al. |
| 12,005,679 | B2* | 6/2024 | Davis ................ B32B 17/10293 |
| 2004/0258929 | A1 | 12/2004 | Glaubitt et al. |
| 2019/0039353 | A1 | 2/2019 | Bureloux et al. |
| 2019/0061481 | A1* | 2/2019 | Kagaya ..................... B60J 1/00 |
| 2019/0337269 | A1 | 11/2019 | Sartenaer et al. |
| 2019/0389181 | A1* | 12/2019 | Hennion ........... B32B 17/10761 |
| 2020/0398646 | A1* | 12/2020 | Mujcinovic ....... B32B 17/10761 |
| 2022/0347974 | A1* | 11/2022 | Sadakane .................. B32B 3/10 |

FOREIGN PATENT DOCUMENTS

| | | |
|---|---|---|
| EP | 1 329 433 A1 | 7/2003 |
| WO | WO 93/07329 A1 | 4/1993 |
| WO | WO 2004/025334 A2 | 3/2004 |
| WO | WO 2005/049757 A1 | 6/2005 |
| WO | WO 2008/059170 A2 | 5/2008 |
| WO | WO 2018/015312 A1 | 1/2018 |
| WO | WO 2018/142078 A1 | 8/2018 |
| WO | WO 2018/178286 A1 | 10/2018 |
| WO | WO 2018/178883 A1 | 10/2018 |
| WO | WO 2020/214431 A1 | 10/2020 |
| WO | WO 2020/221597 A1 | 11/2020 |
| WO | WO 2021/043838 A1 | 3/2021 |

OTHER PUBLICATIONS

Final Office Action as issued in U.S. Appl. No. 17/790,644, dated Nov. 24, 2023.
Notice of Allowance as issued in U.S. Appl. No. 17/790,644, dated Feb. 14, 2024.
International Search Report as issued in International Patent Application No. PCT/FR2020/052615, dated May 10, 2021.
"Ultra-Thin SCHOTT AS 87 eco Aluminosilicate Glass," Nov. 2020, Retrieved from the Internet: URL:https://abrisatechnologies.com/wp-content/uploads/2017/05/Ultra-Thin-SCHOTT-AS-87-eco-Aluminosilicate-Glass.pdf, XP055752220, 2 pages.
"Trosifol®—World of Interlayers: Special PVB film admits ultraviolet light unfiltered," Apr. 2013, XP055751446, Retrieved from the Internet: URL:https://www.trosifol.com/news/detail-view/news/special-pvb-film-admits-ultraviolet-light-unfiltered/, [Retrieved on Nov. 17, 2020], 2 pages.

* cited by examiner

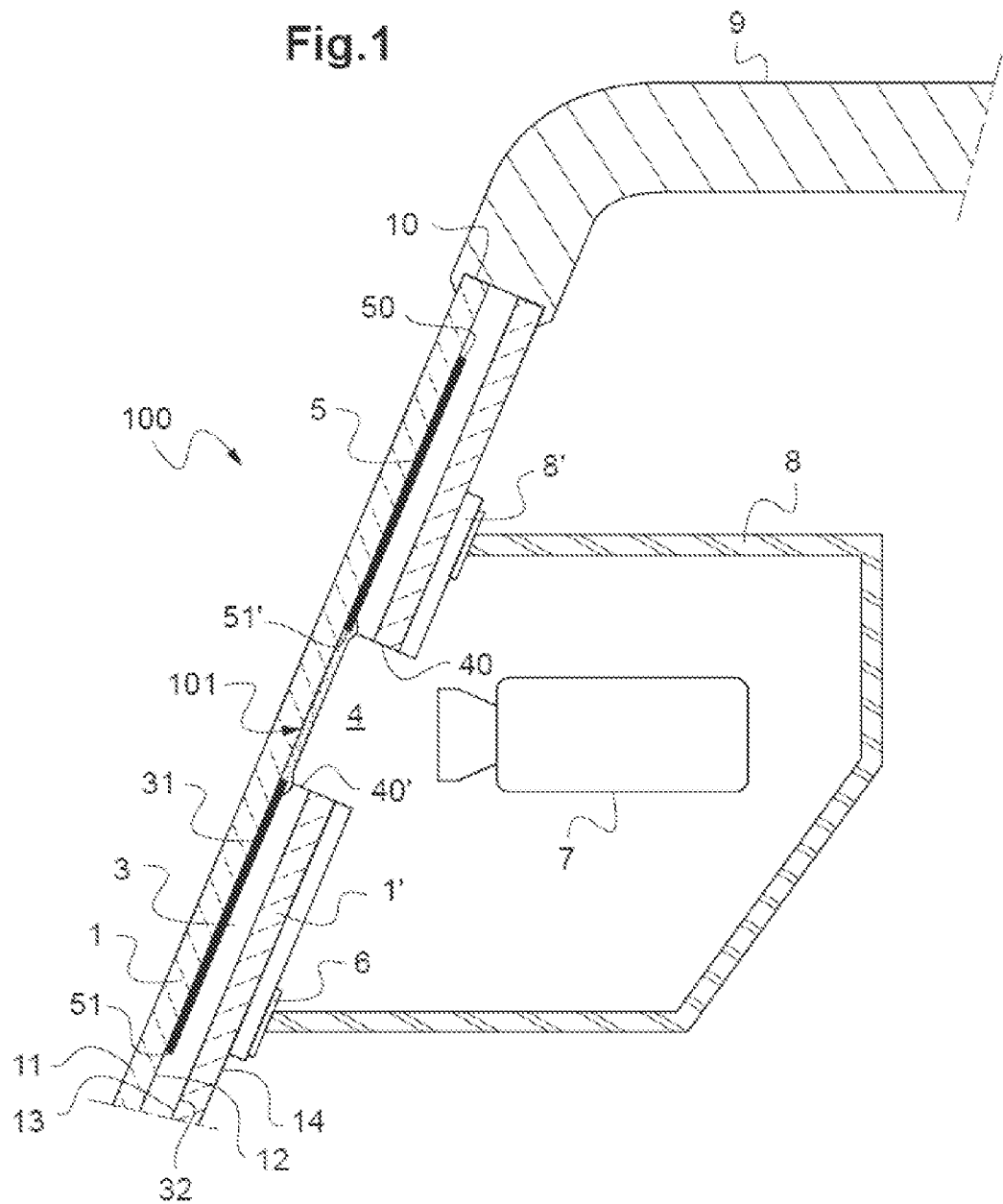

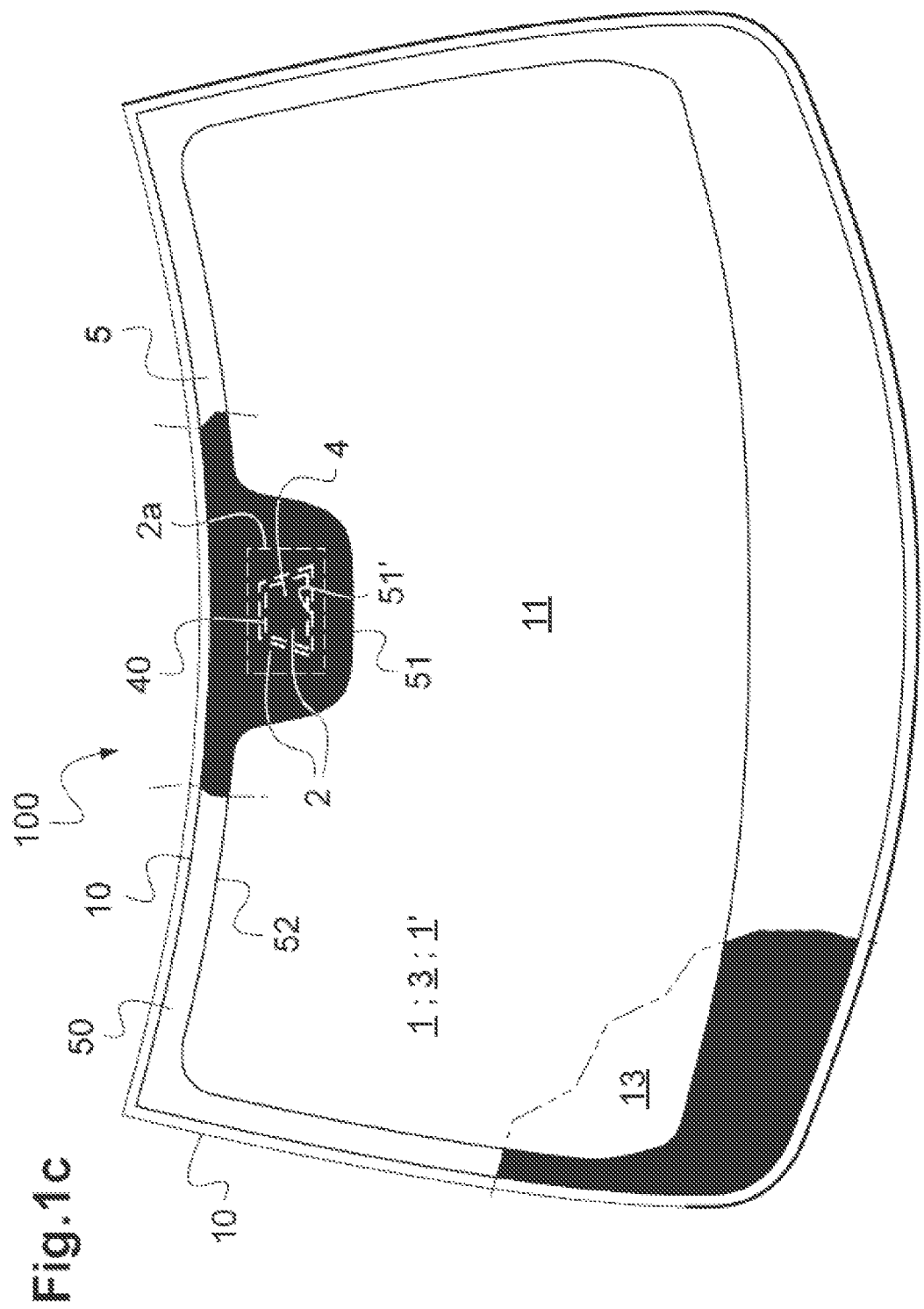

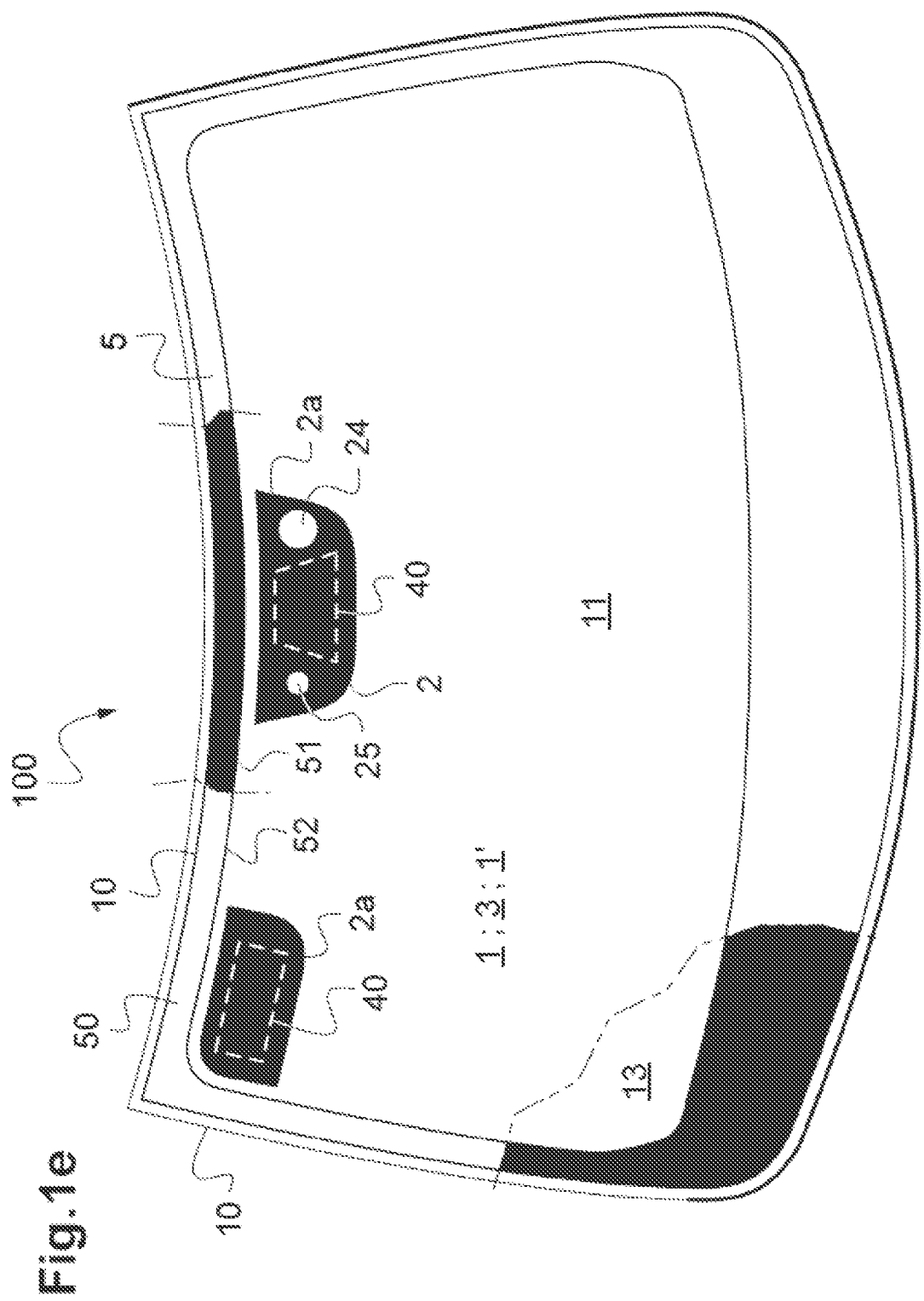

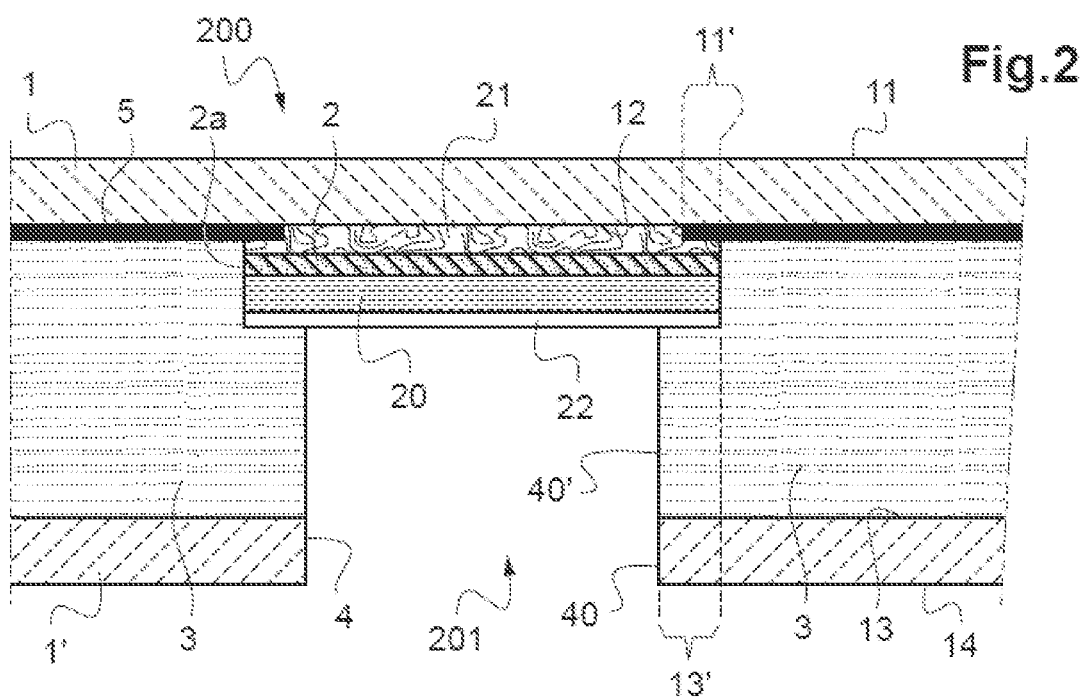

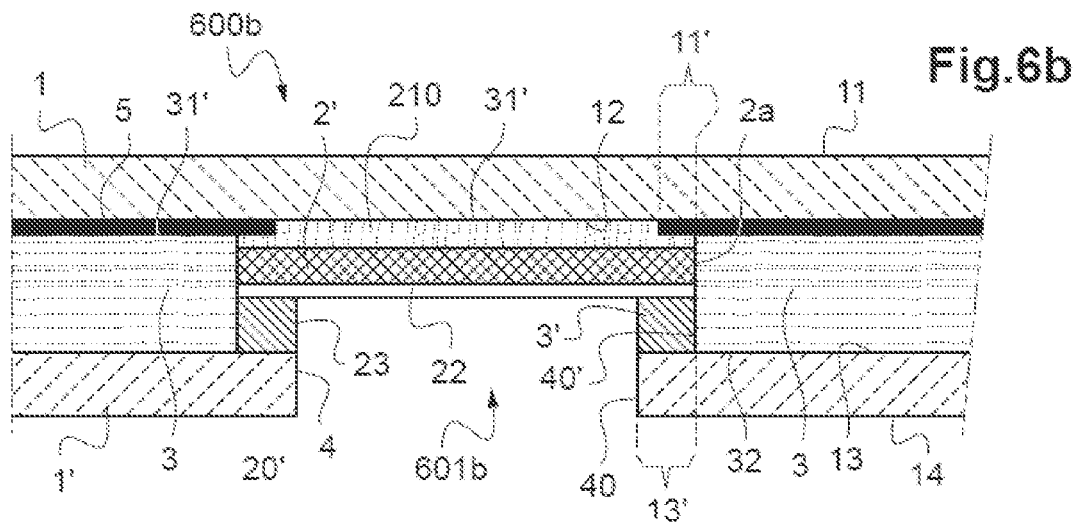
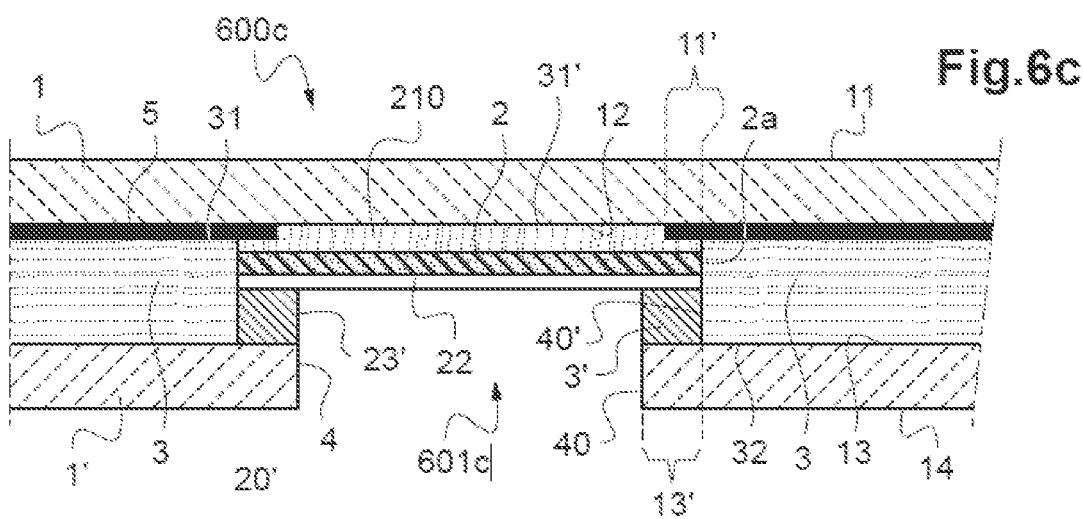

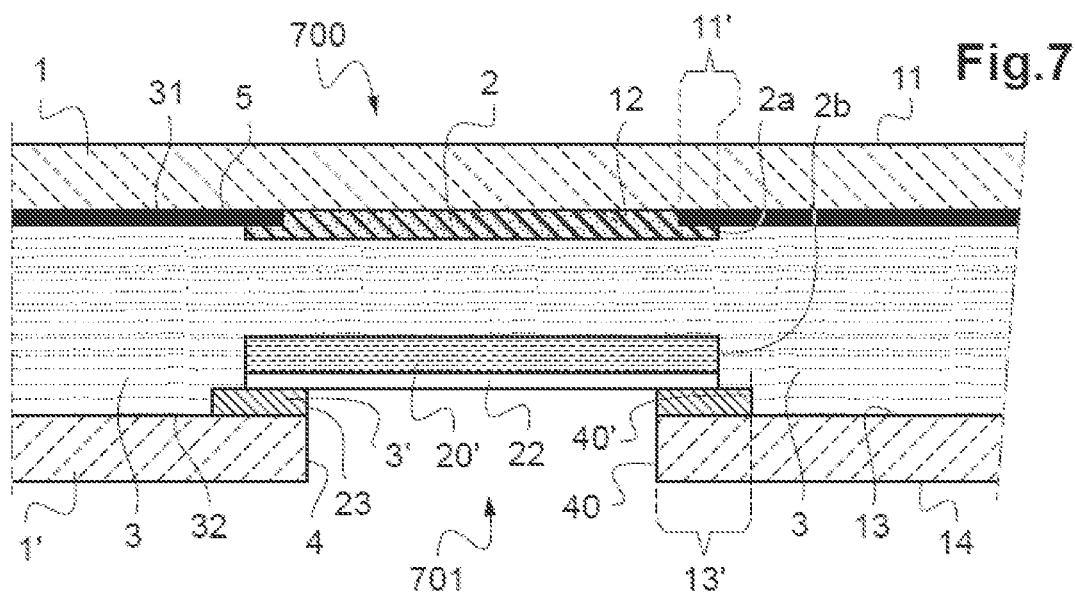
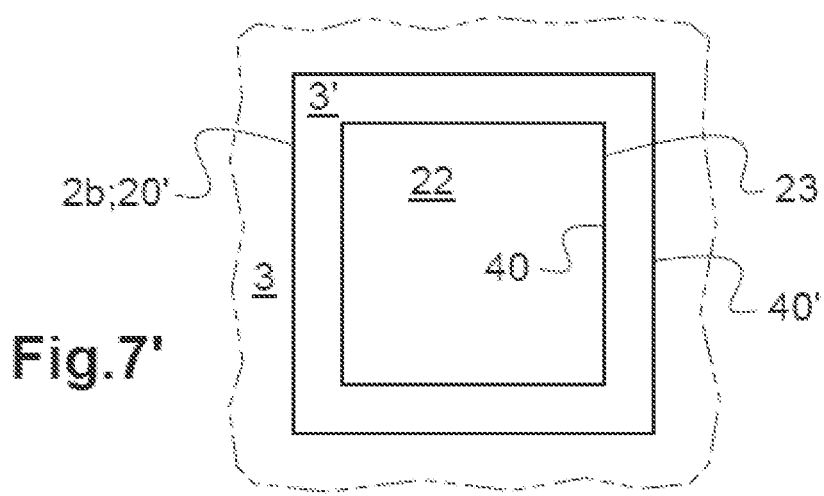

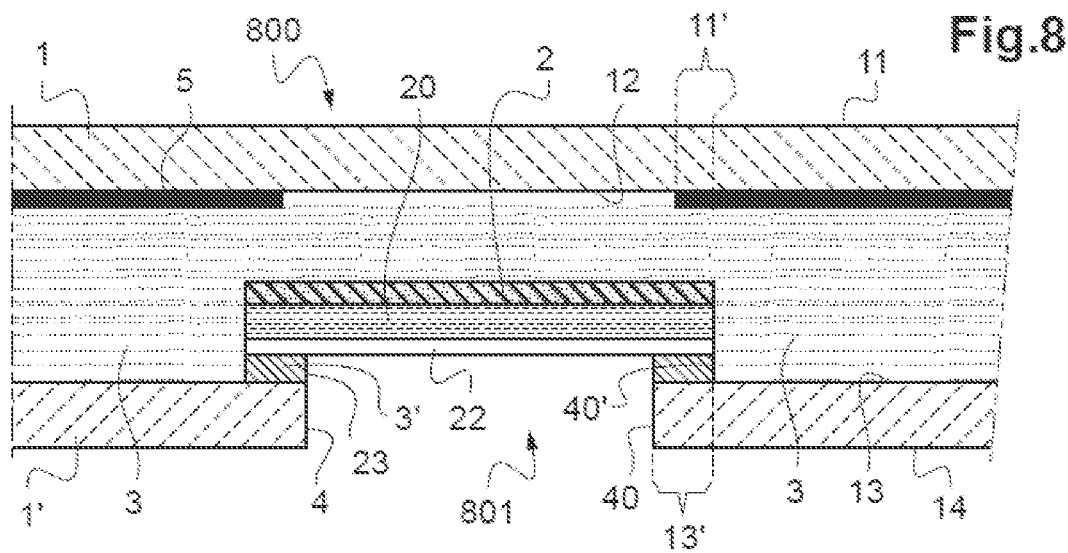
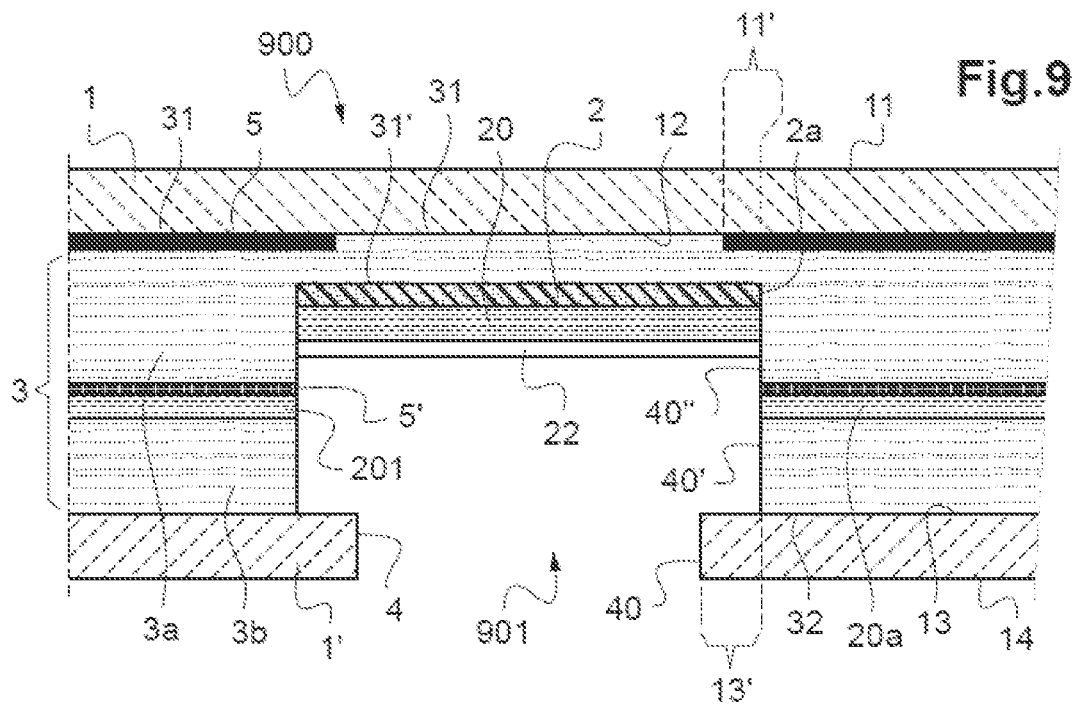

LAMINATED VEHICLE GLAZING, ASSOCIATED DEVICE HAVING A NEAR-INFRARED VISION SYSTEM, AND PRODUCTION THEREOF

CROSS-REFERENCE TO RELATED APPLICATIONS

This application is the U.S. National Stage of PCT/FR2020/052615, filed Dec. 23, 2020, which in turn claims priority to French patent application number 2000023 filed Jan. 3, 2020. The content of these applications are incorporated herein by reference in their entireties.

The invention relates to a laminated glazing, in particular a windshield, in a vehicle, in particular a road vehicle or a train, in association with a system for viewing in the near infrared. The invention also describes a device combining said glazing and the near infrared viewing system and also the process for the manufacture of the laminated glazing.

Glazings for autonomous vehicles and the associated technology are constantly evolving, in particular in order to improve safety.

Remote sensing by laser or LIDAR, an acronym for the expression "light detection and ranging" or "laser detection and ranging", is used in vehicles at the headlights or the roof.

More recently, the patent application WO20180153012 proposes to place a LIDAR operating in the near infrared between 750 nm and 1050 nm behind the laminated windshield comprising two sheets of extraclear glass and an infrared filter, removed from the zone viewed by the LIDAR.

The performance qualities of this device (glazing associated with LIDAR) can be improved.

More specifically, the present invention relates to a laminated (and preferably bent) glazing for a vehicle, in particular a road vehicle (car, truck, public transport: bus, coach, and the like) or rail vehicle (especially having a maximum speed of at most 90 km/h or of at most 70 km/h, in particular subways or tramways), especially a windshield, or also a back window, indeed even a side window, of given thickness E1, for example subcentimetric thickness, in particular of at most 5 mm for a road vehicle windshield, in particular car windshield, which glazing comprises:

a first glass sheet, which is in particular bent, intended to be the exterior glazing, with a first external main face F1 and a second internal main face F2 (oriented toward the passenger compartment), if a motor vehicle with a thickness preferably of at most 4 mm, and even of at most 3 mm or 2.5 mm—in particular 2.1 mm, 1.9 mm, 1.8 mm, 1.6 mm and 1.4 mm—and preferably of at least 0.7 mm or 1 mm
  a lamination interlayer (single fine sheet or plurality of fine sheets), optionally neutral, clear, extraclear or tinted, in particular gray or green, made of polymer material, preferably thermoplastic polymer material, and better still made of polyvinyl butyral (PVB), preferably, if a road vehicle, with a thickness E3 of at most 1.8 mm, better still of at most 1.2 mm and even of at most 0.9 mm (and better still of at least 0.3 mm and even of at least 0.6 mm), the lamination interlayer being optionally acoustic and/or having optionally a cross section decreasing in wedge shape from the top to the bottom of the laminated glazing (especially a windshield), in particular for a head-up display (HUD), a lamination interlayer with a main face FA oriented toward F2 and with a main face FB opposite to FA
  a second glass or plastic sheet intended to be the interior glazing, which is preferably bent and in particular tinted, with a third main face F3 on the F2 side and a fourth internal main face F4 (oriented toward the passenger compartment), if a road vehicle with a thickness E2 preferably less than that of the first glazing, in the case of the glass even of at most 3 mm or 2.5 mm—in particular 1.9 mm, 1.8 mm, 1.6 mm and 1.4 mm—or even of at most 1.3 mm, and preferably of at least 0.7 mm, the thickness of the first and second sheets being preferably strictly less than 5 or 4 mm, even than 3.7 mm.

According to the invention, the first glass sheet exhibits a content by weight of total iron oxide of at most 0.05%.

In particular, the second glass or plastic sheet is capable of absorbing (significantly) in the near infrared; for example, the second sheet is made of glass and exhibits a content by weight of total iron oxide of at least 0.4%.

Consequently, the second (glass or plastic) sheet exhibits a traversing hole in the thickness, in particular with a width W1 which is at least centimetric and preferably of at most 25 cm or better still of at most 15 cm, even better still of at most 10 cm, for a better mechanical strength, in particular of trapezoidal or rectangular, or circular, section.

Under said traversing hole, on the side of the face F2, the glazing comprises a safety element which is transparent at at least one "working" wavelength in the infrared region in a range extending from 800 nm to 1800 nm, in particular 850±5 nm and/or 905±5 nm and/or 1550±5 nm.

Opposite said traversing hole, the laminated glazing (at least the assembly comprising the first glass sheet, said safety element with optionally the lamination interlayer) exhibits a total transmission of at least 80.0%, 90.0% or 95.0% at the working wavelength, in particular measured at 90° or even preferably also at 60° or even up to 60°, with respect to the (local) plane of the first sheet, for example side face F2 (passenger compartment) side and/or face F1 side.

The safety element comprises, in configuration a), a first polymer film or a first stack of polymer film(s) comprising a first polymer film and at least one second polymer film adhesively bonded to the first film, with a total thickness of polymer film(s) E'3 of at least 50 µm and preferably of at most 800 µm, 600 µm, 500 µm (and/or in particular less than or equal to E3 and even total thickness of a) less than or equal to E3), the first film being adhesively bonded to the face F2 which is bare or coated with a functional coating (selective filter and/or heating layer, and the like, thus first film adhesively bonded to the functional coating), the lamination interlayer (single fine sheet or plurality of fine sheets) exhibiting a through hole, "interlayer hole", in the thickness opposite said traversing hole of the second sheet.

The safety element comprises, in configuration b), a second stack comprising the lamination interlayer (single fine sheet or plurality of fine sheets with an optional blind hole of the face FB), and at least one first other polymer film adhesively bonded or in adhesive contact with the face FB which is bare or coated with a functional coating (selective filter, heating layer, and the like, thus first film on the functional coating). The second stack has in particular a total thickness E"3 of polymer film(s) above the face FB of at least 30 µm, 50 µm, 80 µm, 100 µm and preferably of at most 500 µm, 400 µm with preferably E"3<E3.

Thus, according to the invention, in order to achieve a high level of transmission, the following are selected:
  1) an exterior glass extraclear in the targeted near infrared region, 2) an interior glass more absorbent in the targeted near infrared region and necessarily hollowed out.

This solution is more effective than that of the prior art based on two entire extraclear glasses.

In addition, by avoiding the use of a second extraclear glass, it improves comfort (heat in the vehicle) and the esthetics and is more economical.

The shape and the dimensions of the traversing hole are configured according to the techniques of the art so as to efficiently and selectively transmit and collect all of the radiation passing through the glazing (windshield, back window, and the like).

For example, the hole is of the same shape as the infrared viewing system, such as LIDAR.

The hole (open or closed) can in particular be of convex cross section, especially preferably trapezoidal cross section, or also circular or oval or elliptical or even rectangular, square, and the like, cross section.

The hole has in particular a dimension defined by the field of view of the LIDAR as a function of its positioning.

The traversing hole of the second (glass or plastic) sheet can be free or occupied in all or part, for example by a filling material which is transparent at the working wavelength, and/or occupied by insertion of a portion of the LIDAR.

The traversing hole can be:
closed hole (surrounded by the wall of the second glass or plastic sheet), thus within the glazing, in particular spaced from the closest edge face of the glazing by at least 3 cm or 5 cm
open or emerging, forming a (peripheral) notch.

However, making a hole can weaken the glazing, in particular:
in the event of glass breakage if chippings or any other small-sized exterior object which hits in the zone opposite said traversing hole
by crack propagation if splinter in the zone opposite the traversing hole
mechanical stress in the zone facing the traversing hole or the internal glass—by propagation of a crack outside the zone facing the traversing hole entering the zone and leading to breakage.

If all the interlayer is removed (case a)) or all or part of the PVB is retained (case b)), blind hole on the face FB side for example, the safety element made of film(s) of controlled thickness and which is transparent at the working wavelength ensures (alone or with the remaining interlayer):
an effect of rolled glass type (if broken) retains the broken glass,
maintainance of the overall structure,
to prevent propagation if broken inside and can reinforce the resistance of the glass under stress (bent internal glass) and delay the breakage.

In the case b), the applicant has observed that, if the interlayer, such as PVB with a free face FB (or with a separate deposit of a film having a certain toughness) is retained, the PVB transforms less well and strongly degrades the light transmission at the working wavelength (and in the visible region) and can be less resistant and/or less adherent to the first sheet of glass. The second stack thus makes possible correct transformation of the PVB, probably by ensuring sealing during the degassing. Preferably, it is adhesively bonded on face F3 around the traversing hole.

The configuration a) or b) can comprise one at least of the following functional polymer films (of submillimetric thickness and even of at most 200 µm or 100 µm), in particular polyester or PET films, which are transparent at the working wavelength: selective filter film, safety or breakage-prevention film, heating film, antireflective or AR film (last, with a free surface). In the case of several films, they are adhesively bonded, by a PSA adhesive, for example.

In particular, for a) or b), at most three polymer films or two polymer films (in particular except for front and/or rear band) are preferred.

Naturally, a film can combine two or more functions by its surfaces (selective coloring coating, coating which is heating, AR by texturing or coating, and the like) and/or bulk (bulk selective filter, bulk, for example, wire heating).

Consequently, at least one polymer film of the safety element according to a) or b) comprises at least two functions, preferably a function by at least one functional coating on said film, functions chosen in particular from the following: selective filter, heating, antireflective, breakage-prevention. For example:
film with a selective filter coating and/or an antireflective coating (same face or opposite faces)
selective filter film (colored in bulk) with an antireflective coating and/or with a heating coating (opposite faces)
breakage-prevention or safety film with a selective filter coating and even with an antireflective coating (same face or opposite faces).

Throughout the description, AR means antireflective, at least at the working wavelength.

In the case a), the (colorless, and the like) lamination interlayer exhibits a traversing hole in the thickness preferably at least extending the traversing hole of the second sheet, which is optionally broader, in particular by at most 10 mm, or narrower by at most 3 mm or 1 mm, in particular of trapezoidal or rectangular or circular and the like section (in particular of the same shape and same proportionality as the section of the traversing hole of the glass).

In the case b), the (colorless, and the like) lamination interlayer optionally exhibits a partial hole in the thickness preferably at least extending the traversing hole of the second sheet, which is optionally broader, in particular by at most 10 mm, or narrower by at most 3 mm or 1 mm, in particular of trapezoidal or rectangular or circular and the like section (in particular of the same shape and same proportionality as the section of the traversing hole of the glass).

The face FB of the lamination interlayer can be partially (in the case of the case b)) or completely (cas a)) holed in thickness in line with the traversing hole, at the face F3, said hole being according to a given shape (for example trapezoidal) being framed in a rectangle, with a hole of the lamination interlayer (PVB)
wider than said traversing hole, for example by at most 15 mm (PVB set back)
which is equal to the traversing hole,
which is less than said traversing hole by at most 5 mm, 3 mm, 1 mm.
To strengthen the protection:
the security element preferably extends into a border zone of said traversing hole over at least 2 mm, 5 mm, 1 cm and even at least 3 cm or 5 cm. In the case of a stack, at least one of the polymer films can extend into the border zone
and/or the safety element exhibits at least one cumulative thickness of films of at least 100 µm and preferably of at most 600 µm, 400 µm, 300 µm.

In the case a), the presence in the border can make it possible for the polymer film(s) to be retained or at least well positioned with respect to the traversing hole.

In the case b), the presence in the border can make it possible to guarantee better sealing and thus transformation of the interlayer (PVB), with or without a blind hole, opposite the traversing hole of the second sheet.

There is also an esthetic aspect because its edges are, for example, masked by a masking layer (enamel or other on F2, ink on PVB).

Preferably, the safety element is bonded (adhesively bonded, in adhesive contact) to the face F2 (front bonding) and also opposite the border zone of the hole is bonded (adhesively bonded, in adhesive contact) to the face F3 (rear bonding) in this border zone rather than spaced or pressed against the face F3.

The first polymer film (alone) or the first stack or also the second stack can be bonded (adhesively bonded) to the face F3 in a border zone of said traversing hole over at least 2 mm, 5 mm, 1 cm and even at least 3 cm or 5 cm.

In the case a), the first polymer film (alone) or the first stack is adhesively bonded by an adhesive, in particular a pressure-sensitive adhesive PSA or hot-melt adhesive (for example deposition by the liquid route or double-sided tape, with a thickness from 1 to 50 µm), and/or comprises a polymer local band, "rear band", (such as PVB or of PVB type) in (direct) adhesive contact with the face F3 which is bare or coated with a functional coating (masking, solar control, heating, and the like, coating), thus rear band optionally in adhesive contact with the functional coating.

In the case b), the second stack comprises a polymer local adhesion band, "rear band", (such as PVB or of PVB type) in adhesive contact with the face F3 which is bare or coated with a functional coating (masking, solar control, heating, and the like, coating), thus rear band optionally in adhesive contact with the functional coating.

The rear band can be absent under said traversing hole or overstepping by at most 5 mm, 3 mm under said traversing hole. Under the face F3, it can also overstep the underlying film(s) (first or second stack, in particular one at least of these: selective filter film, AR film, safety or breakage-prevention film, in particular of at least 150 µm or 200 µm, heating film, and the like), in particular by at most 5 cm or 1 cm, in order to better come into contact with the PVB (during the laminating) or to reinforce this zone. Under the face F3, the rear band, in particular based on poly(vinyl butyral) (PVB), can be in (lateral) adhesive contact with the lamination interlayer in order to form a continuity in material (no space between interlayer and the rear band).

The rear band, even if made of PVB, can be a PVB distinct from the PVB of the interlayer and/or at the very least with a different thickness from E3, for example thinner. The rear band (PVB)/interlayer (PVB) interface can be discernible.

For a), the first polymer film can be adhesively bonded or in adhesive contact with the face F2.

For a), the first polymer film, in particular polyester film, in particular PET film, is, for example, adhesively bonded to the face F2 by
 an adhesion layer, which is preferably a pressure-sensitive adhesive PSA or hot-melt adhesive or
 a polymer local band, "front band", in adhesive contact with the face F2 opposite said traversing hole, preferably based on poly(vinyl butyral) (PVB) of submillimetric thickness and better still <E3, in particular of at most 0.4 mm, the front band is preferably in adhesive contact with the lamination interlayer.

The front band can also overstep (facing the border zone of the traversing hole) the overlying film(s) of the first polymer film alone or of the first stack (in particular one at least of these: selective filter film, AR film, safety film, heating film, and the like), in particular by at most 5 cm or 1 cm, in order to better come into contact with the PVB (during the laminating).

The front band, in particular based on poly(vinyl butyral) (PVB), can be in (lateral) adhesive contact with the lamination interlayer in order to form a continuity in material (no space between interlayer and the rear band).

The front band, even if made of PVB, can be a PVB distinct from the PVB of the interlayer and/or at the very least with a different thickness from E3, for example thinner. The front band (PVB)/interlayer (PVB) interface can be discernible.

The front and/or rear band is based (made of) poly(vinyl butyral) (PVB) can contain less than 15% by weight of plasticizers, preferably less than 10% by weight and better still less than 5% by weight and especially without plasticizer, in particular with a thickness of at most 0.5 mm, preferably at most 0.3 mm and better still of at most 0.15 mm, in particular from 25 to 100 µm, 40 to 70 µm and even of at most 50 µm.

And the lamination interlayer is based made of poly(vinyl butyral) (PVB)—with plasticizer, in particular with more than 15% by weight of conventional plasticizers—and in particular with a thickness E3 of at least 0.3 mm and better still of at least 0.5 mm.

Under the face F3, the rear band and/or the front band, in particular based on poly(vinyl butyral) (PVB), is in adhesive contact with the lamination interlayer.

In particular, it is possible to choose, as plasticizer-free PVB front and/or rear band, the product "Mowital LP BF" from Kuraray with the thickness which is desired.

In order to simplify and accelerate the manufacture of the glazing, it may be preferred to use an element preassembled by adhesive bonding or adhesive contact off the lamination line.

PVB front band/first polymer film (alone) or first stack is preassembled and this preassembled structure can even be placed on an interlayer PVB fine sheet (holed under said traversing hole) or on a PVB rear band, by local heating. The front band is in adhesive contact with the face F2 and before the front face F'A of the film opposite said traversing hole.

For b), the second stack comprises one of the following sequences:
 (polymer film)/interlayer, such as PVB (with optional heating wires)/selective filter layer/adhesive, such as PSA/AR film forming a free surface opposite the traversing hole
 (polymer film)/interlayer, such as PVB (with optional heating wires)/selective filter layer/adhesive, such as PSA/film
 (polymer film)/interlayer, such as PVB (with optional heating wires)/selective film (/adhesive, such as PSA/AR film forming a free surface opposite the traversing hole)
 functional coating being selective filter/interlayer, such as PVB (with optional heating wires)/AR film forming a free surface opposite the traversing hole
 functional coating being selective filter or heating layer/interlayer, such as PVB (/other first film, in particular AR film, forming a free surface opposite the traversing hole)
 polymer film(s)/interlayer, such as PVB/other first film, in particular AR film, forming a free surface opposite the traversing hole.

For the configuration b), the interlayer is, for example, a PVB/polymer film, such as PET film, which is functional/PVB trilayer, the other first polymer film extends outside the zone of said traversing hole and is a portion of said functional film, the functional PET film optionally carrying a solar control layer (or any other layer which absorbs at the working wavelength) absent opposite said traversing hole (if necessary).

For b), the face FA of the interlayer (PVB, trilayer, and the like) can be in adhesive contact with the face F2 which is bare or coated with a functional coating (selective filter, heating layer, and the like) or else the face FA is bonded with one or more underlying polymer films (selective film, just for safety, which has in particular a thickness Ei of at least 50 μm.

For b), the face FB can exhibit a blind hole in the thickness opposite said traversing hole of the second sheet, in particular housing the first other polymer film (indeed even other film(s) adhesively bonded on top).

The blind hole on FB can be useful if overlying film(s) are too thick.

For b), the face FA can exhibit a blind hole in the thickness opposite said traversing hole of the second sheet and the face F2 is in adhesive contact or bonded with one or more (adhesively bonded) polymer films underlying FA film(s) which has in particular a thickness Ei of at least 50 μm, 80 μm or 100 μm, 150 μm, in particular breakage-prevention film.

The blind hole on FA can be useful if underlying film(s) are too thick.

The PVB with a traversing hole can be tinted and absorbent at the working wavelength.

Furthermore, the glazing according to the invention can comprise an adhesively bonded, opaque, plate on face F4 comprising a hole in line with said traversing hole (wider or in the extension of said traversing hole), especially opaque, optionally reinforced, plastic plate, with means capable of supporting or holding a system for infrared viewing at said working wavelength, such as a LIDAR.

In particular, to the face F4 can be adhesively bonded a plate, in particular of subcentimetric thickness, especially 1 to 3 mm, and even 1.5 to 2.5 mm. It is, for example, made of plastic which is optionally reinforced (fibers, and the like), for example polycarbonate (PC), polymethyl methacrylate (PMMA), polyethylene (PE), polypropylene (PP), polyamide (PA66), acrylonitrile-butadiene-styrene (ABS) and their ABS-PC alloys, polystyrene (PS), acrylonitrile-styrene-acrylate ASA, based on polymer of formaldehyde (polyoxymethylene POM), on polybrominated terphenyl (PBT), preferably charged with glass fibers for even more strength, in particular PA66 GF30 (30% glass fibers).

This plate can be used to carry or contribute to holding or stabilizing the LIDAR and/or a housing masking the LIDAR. This plate can be holed in line with said traversing hole. Like said traversing hole, this plate is preferably peripheral, in particular along the upper edge of the glazing. For example, it is in the central zone, (conventional) zone of the rearview mirror (present or absent).

It can also carry or contribute to holding or stabilizing another or other functional element(s), such as sensors, for example sensor of a camera in the visible region and/or of a thermal camera (beyond 2.5 μm, ranging at least from 9.5 to 10.5 μm and preferably from 8 to 12 μm) or any other sensor (rain, exterior brightness, and the like). It comprises as many holes as necessary (and of suitable size) for the sensor(s). It can even carry or contribute to holding or stabilizing the thermal camera or the visible camera and/or an individual housing or one shared by the LIDAR, by the thermal camera and/or by the visible camera.

Advantageously, the glazing according to the invention exhibits, under said traversing hole of the second sheet, preferably on the side of the face F2, a selective filter which absorbs in the visible region and which is transparent at at least one "working" wavelength in the infrared region in a range extending from 800 nm to 1800 nm, in particular 905±5 nm and/or 1550±5 nm and/or also 850±5 nm.

Opposite said traversing hole, the laminated glazing (by virtue of the selective filter) then also exhibits:

a total transmission of at most 10.0%, 5.0% or 1.0% or 0.5% in the visible region (in particular at least at a reference value of 550 nm+−50 nm or in a range extending from 500 to 600 nm or between 400 and 700 nm) measured at 90° or even preferably also at 60° or even as far as 60°, on the face F1 side, better still at least in a range extending from 500 to 600 nm or between 400 and 700 nm, even throughout the range of the visible region between 390 nm and 750 nm, in particular 0.5% over 390-750 nm, and 0.1% over 390-600 nm, especially the selective filter masking (significantly) the traversing hole viewed from the face F1.

Preferably, the selective filter is bonded (adhesively bonded, in adhesive contact) to the face F2 (front bonding) or to the face F3 (rear bonding) or both, rather than pressed against the face F2 and/or against the face F3.

The selective filter serves to conceal the infrared viewing system at said working wavelength, such as a LIDAR, from the outside of the vehicle without damaging the excellent transmission at the working wavelength.

If it includes a polymer film, it can contribute to safety.

The invention is very particularly suitable for glazings (windshield, back window, and the like) in autonomous or semiautonomous vehicles: level L2+, L3, L4 and L5 (full autonomous, thus autonomous), as well as vehicles of the Robot Taxi and Shuttle type, and the like.

Iron oxide, present as an impurity in the majority of natural raw materials used in glassmaking (sand, feldspar, limestone, dolomite, and the like), absorbs both in the visible and near ultraviolet region (absorption due to the ferric $Fe^{3+}$ ion) and especially in the visible and near infrared region (absorption due to the ferrous $Fe^{2+}$ ion); this is why the iron oxide is reduced in the first glass sheet.

In the second glass sheet (if made of glass), it is thus possible to choose a higher content of iron oxide.

The angle of the glazing, in particular a road vehicle windshield, can typically be between 21° and 36°, with respect to the ground, and on average 30°. Consequently, a high transmission at 60° is particularly advantageous because this is the angle of incidence of the beam of the LIDAR on the windshield if the latter is at 30° from the ground.

The transmission in the infrared region is measured, for example, with a Fourier spectrometer, such as the BrukerVertex-70.

In order to quantify the transmission of the glass in the visible region, there is often defined a light transmission factor, called light transmission, often abbreviated to "$T_L$", calculated between 380 and 780 nm and brought back to a glass thickness of 3.2 mm or 4 mm, according to the standard ISO 9050:2003, thus taking into consideration the illuminant D65, as defined by the standard ISO/CIE 10526, and the C.I.E 1931 standard colorimetric observer, as defined by the standard ISO/CIE 10527. Naturally, the light transmission $T_L$ of the laminated glazing in a zone without a hole (central zone of the windshield) is preferably at least 70% or 75%, 80% or 85% or 88%.

Said selective filter is, for example, local with a given surface area S0 and the orthogonal projection of the surface area S0 onto the second sheet encompasses at least the section Sc of the traversing hole.

The selective filter is, for example, an entire layer, indeed even with discontinuities for example forming a (micro- or nano) mesh.

The selective filter can be of any nature: coating (ink, varnish, and the like), flexible film; it can be located at said traversing hole or more extendedly, for example in order to conceal one or other sensors, as described in detail later.

The selective filter is (mainly) in a zone with a single glass sheet.

The incorporation of the selective filter under the hole, in particular its adhesive bonding, will be described in detail below in order to avoid the creation of optical defects (distortion, and the like), in particular by puckering, delamination or appearance of bubbles or to facilitate its precise positioning or the speed of its installation industrially.

For a selective filter involving a polymer film, it is preferred for it to be in adhesive contact with the face F2 or with the lamination interlayer.

The filter will conceal the hole and the LIDAR but it may also be desired to cover a zone devoid of opaque masking layer (absorbing at the working wavelength), for example a gap in this layer, or also a zone which is contiguous or in the vicinity.

The selective filter can have a closed outline, surrounding the hole (present over the entire circumference of the closed hole), for example with a shape similar or proportional to the hole. The selective filter can also be a simple geometric shape (rectangle, and the like) in which the closed hole is framed.

The traversing hole with the constant or variable section, in particular trapezoidal or rectangular or as a disk or oval, has, for example, a smaller dimension (diameter) of at least 2 cm, 3 cm, 5 cm and preferably a greater dimension of at most 30 cm or 25 cm. The filter can thus mask in particular a zone, "camera" zone, provided with sensor(s), in particular a camera in the visible region or in the far infrared region (thermal camera). However, in order to do this, the selective filter exhibits a gap (closed or emerging) in the zone provided for allowing the passage of the light rays resulting from the scene to be captured by the visible or thermal camera.

In said traversing hole, there may be an insert, preferably with a width of at most 1 cm, in particular made of polymer material. The insert is fitted at least to the wall of the second glass or plastic sheet delimiting the hole. This insert will also be concealed by the selective filter.

In order not to identify the LIDAR zone, the selective filter preferably does not form a (substantially) opaque isolated zone (visible, identifiable from the face F1), adjacent to a transparent zone of the laminated glazing over all or part of its circumference. The selective filter can thus:
- be incorporated in a masking/decorative zone (like that normal at the periphery of the glazing) provided with an (emerging or closed) gap,
- be adjacent to this masking zone,
- and/or extend to form all or part of this decorative zone.

Advantageously:
the selective filter extends beyond said traversing hole, from the outside extends a masking layer or masks a gap in a peripheral masking layer.

The selective filter is defined by an L*1, a*1, b*1, defined in the L*a*b* CIE 1976 chromatic space. The masking layer of color C1 also is defined by an L*2, a*2, b*2 with a colorimetric difference ΔE* given by the following formula:

$$\Delta E^* = \sqrt{(\Delta L^{*2} + \Delta a^{*2} + \Delta b^{*2})}.$$

Preferably ΔE*<4, better still ΔE*<2 (the human eye detects with difficulty), even better still ΔE*<1 (the human eye does not detect).

The opaque masking layer is in particular in the form of at least one coating on one of the first and second sheets and/or on the lamination interlayer.

This zone is, for example, a rectangular band along an edge of the glazing, in particular longitudinal edge, especially of a windshield. The band is in particular a strip under the entire length of the edge and widened in the zone (in particular central zone) with said traversing hole and the selective filter hiding it.

The masking layer can be on either side of the (closed) hole and even surround the (closed) hole.

The gap can have a closed outline, surrounding the hole, for example with a shape similar or proportional to the hole.

The selective filter can thus extend beyond the traversing hole.

In a first configuration, it extends (widely) beyond into a border zone of the hole (thus under the second glass sheet) to form, by itself alone, a masking element, in particular a peripheral masking band and preferably along a longitudinal edge of the glazing, in particular longitudinal edge of a windshield, indeed even a masking frame.

In this case, the selective filter has a double functionality and can replace all or part of the opaque enamel (on face F2 and/or F3 and/or F4) or the ink printed on the lamination interlayer conventionally used.

In a second configuration, the selective filter remains local, extends beyond the hole by at most 50 mm, the glazing additionally comprising the opaque masking layer, in the form of at least one coating on one at least of the first and second sheets and/or on the lamination interlayer rather than a bulk-tinted element.

In particular (outside said traversing hole, in the border zone), the selective filter is on the face F2 under the safety element and is in contact with the masking layer and even the selective filter is a coating on the masking layer, indeed even under the masking layer.

Especially, the masking layer is on the face F2, the selective filter is spaced from and above the masking layer on the face F2 or is in contact with the masking layer, in particular forms a coating on the masking layer, in particular overlapping over at most 50 mm.

Especially, the selective filter is a coating on the face F2 which is overlapped by the masking layer, in particular overlapping over at most 50 mm.

The opaque masking layer is preferably a continuous layer (flat plate with a solid edge or alternatively a graduated edge (set of patterns)).

The selective filter is between the face F2 and the face F3.

Under said hole, the selective filter can comprise a (flexible) polymer film with a thickness which is submillimetric (to prevent excess thickness) and even of at most 0.5 mm/0.3 mm/0.15 mm against the face F2 and bonded to the face F2 in the border zone of said hole.

However, to avoid any risk of optical distortions (presence of bubbles, and the like), it is preferred, in the zone of said traversing hole, for the selective filter to be bonded to the face F2: either the selective filter comprises an above-mentioned polymer film which is adhesively bonded (for example a film, such as a PET film, which does not stick to the glass, even after laminating) or in adhesive contact with the face F2 (for example a material, such as PVB, which sticks to the glass after laminating), or the selective filter is a coating on the face F2.

In one implementation, the selective filter comprises a polymer film, in particular PET film, preferably with a thickness of at most 0.3 mm/0.15 mm, in particular:

- a coloring polymer film, in particular PET film, with a thickness of at most 0.3 mm/0.15 mm, comprising a bulk-coloring agent,
- and/or (colorless or tinted) film coated with a coloring layer made of a compound comprising a (organic, polymeric, organic/inorganic hybrid: sol-gel route) matrix and a coloring agent dispersed in said matrix, said coloring agent absorbing (substantially all of) the light located in said visible region and being (substantially) transparent at said working wavelength on a main face.

In one implementation, the selective filter comprises a layer made of a compound comprising an (organic, polymeric, inorganic or hybrid) matrix and a coloring agent dispersed in said matrix, said coloring agent absorbing (substantially all of) the light located in said visible region and being (substantially) transparent at said working wavelength, layer forming a coating in the zone of said traversing hole of the second sheet:

- on the face F2
- or on the lamination interlayer, side of face FA or FB, preferably made of PVB, in particular ink additionally comprising PVB particles
  - on an additional polymer film, in particular PET film, on a main face, side of F2 or F3, with a thickness of at most 0.3 mm/0.15 mm, preferably bonded to the face F2.

The coloring layer can be of submillimetric thickness and even of at most 20 µm.

The compound/the polymeric matrix of the coloring layer is chosen from monomers, oligomers, or polymers comprising at least one methacrylate functional group, epoxides, varnishes consisting of dispersed PVB particles, latex, polyurethane or acrylate.

The selective filter can contain any pigment or dye having a greater transmittance in the infrared region than its transmittance in the visible region, such as a near infrared black ink which absorbs substantially the wavelengths in the visible region while transmitting those in the near infrared region. For example, the selective filter (as layer) can contain dyes or inks, such as the Spectre™ inks, for example Spectre™ 100, 110, 120, 130, 140, 150 or 160 (Epolin, Newark, NJ); Mimaki inks, for example Mimaki ES3, SS21, BS3, SS2 or HS (Mimaki Global, Tomi City, Nagano, Japan); or Seiko inks, for example Seiko 1000, 1300, SG700, SG740 or VIC (Seiko Advance Ltd., Japan), or also black ink IR9508 from MingBo Anti-forgery Technology Co. Ltd.

The selective filter (as layer) can contain one or more black, cyan, magenta or yellow dye components.

The selective filter (as layer) can be a coating including dyes or pigments or both. In some examples, the layer which selectively absorbs wavelengths can include Lumogen® Black FK 4280 or Lumogen Black FK 4281 (BASF, Southfield, MI).

In some examples, the selective filter (as layer) can include a multilayer film, with one or more layers of the multilayer film including dyes, pigments or both.

Preferably:

- the coloring agent is chosen from Sudan Black BR or Nigrosine Solvent Black 5, and is preferably Sudan Black B®,
- the coloring agent represents between 0.1% and 10% by weight of the layer, preferably between 0.2% and 3% by weight of the layer.

The selective filter (as layer) can be a varnish, in particular of less than 30 µm.

For this selective filter as layer, it is possible to vary the layer thickness or the % by weight of coloring agent, in particular at least from 1%, 5% to 20%, 30%.

The selective filter can comprise a polymer film, such as PET film, charged in its bulk with dyes by a roll-to-roll deep-dyeing process, in particular immersion in a hot bath with the dyes. The final concentration of dye has to be sufficient to introduce the opacity in the visible region. Reference may be made to the patent WO9307329 or U.S. Pat. No. 5,162,046.

A selective layer can be put on a polymer film, such as a PET film, per main face.

It is possible to combine a bulk-tinted polymer film, such as PET film, and a selective layer on this film, another polymer film, such as PET film, on the PVB remaining opposite said hole or on the face F2.

A bulk-tinted film can be said selective filter, for example the product Smoke Plus films from Solar Gard.

According to one implementation:

- the first film or the first other film or any other film of stack a) or b) forms part of a selective filter or forming a selective filter
- the first or second stack comprising an AR film forming a free surface opposite the traversing hole
- the functional layer is a selective filter (coating on face F2) or a heating layer, the first film or first other film is an AR film or a simple safety and/or heating film, the first or second stack comprises lastly AR film or AR coating. The choice of the nature and/or of the thickness of the polymer film(s) depends in particular on the transparency at the working wavelength, on the flexibility and/or on the toughness desired.

It is possible to have a first breakage-prevention polymer film and a selective polymer film adhesively bonded on top, indeed even another AR film last.

The polymer film(s) according to the invention can fit the curvature of the first sheet, in particular be supple (flexible or semiflexible).

The film(s) can in particular be based on polyester, especially a polyethylene terephthalate (PET) or polyethylene naphthalate (PEN), on polycarbonate, a polyolefin (polyethylene, polypropylene), on polyurethane, on polymethyl methacrylate (PMMA), on polyamide, on polyimide or a polyvinyl chloride (PVC), indeed even on fluoropolymer, such as ethylene-tetrafluoroethylene (ETFE), polyvinylidene fluoride (PVDF), polychlorotrifluoroethylene (PCTFE), ethylene-chlorotrifluoroethylene (ECTFE) or fluorinated ethylene-propylene copolymers (FEPs), or a polystyrene (PS). Preference is given to PET (and the interlayer made of PVB).

Several types of adhesives exist. Hot-melt adhesives, which have to be melted and which adhesively bond when they cure, thermosetting ones which cure when their components react or when a solvent evaporates, pressure-sensitive adhesives PSAs which adhesively bond immediately, by simple contact.

According to the invention, the PSA adhesive (on face F2, F3, between films, on interlayer, such as PVB) can, for example, have a thickness of at most 50 μm (adhesive tape type), in particular of at most 20 μm if deposited by the liquid route.

The adhesion layer can be a pressure-sensitive adhesive sheet.

The (non-adhesive) adhesion layer can, for example, be a gel, in particular a hydrogel, based on polyacrylamide, polyvinyl alcohol, polyurethane, polysaccharide, polyethylene glycol, polylactic acid or silicone.

The adhesion layer can even be a pressure-sensitive adhesive. A pressure-sensitive adhesive, abbreviated to PSA and commonly called self-adhesive, is an adhesive which forms a bond when a pressure is applied to it, so as to render the adhesive integral with the surface to be adhesively bonded. Neither solvent nor water nor heat is necessary to activate the adhesive. It is used in automobile trims and in a great variety of other products.

As its name "pressure-sensitive" indicates, the degree of bonding between a given surface and the self-adhesive binder is influenced by the amount of pressure used to apply the adhesive to the target surface. Other factors are also involved and are important for good adhesion, such as softness, surface energy and removal of contaminants.

PSAs are generally designed to form a bond and to maintain the latter at ambient temperature. A person skilled in the art will take care to choose a self-adhesive adhesive formulation suited to the conditions of its use. This is because PSAs generally experience a reduction in or disappearance of their adhesion at low temperature and experience a reduction in their ability to withstand shearing at elevated temperatures.

PSAs are generally based on an elastomer coupled with an appropriate additional adhesive agent or "tackifying" agent (for example an ester resin).

The elastomers can be based:
on acrylates, which may be sufficiently sticky not to require an additional tackifying agent,
on nitriles,
on silicone, requiring special tackifying agents, such as silicate resins of "MQ" type composed of monofunctional trimethylsilane ("M") which has reacted with quadrifunctional silicon tetrachloride ("Q"). PSAs based on silicone are, for example, polydimethylsiloxane gums and resins dispersed in xylene or a mixture of xylene and toluene,
on block copolymers based on styrene, such as styrene-butadiene-styrene (SBS), styrene-ethylene/butylene-styrene (SEBS), styrene-ethylene/propylene (SEP) or styrene-isoprene-styrene (SIS) block copolymers,
on vinyl ethers.

Advantageously, the pressure-sensitive adhesive is chosen from PSAs based on acrylates and PSAs based on silicone.

These adhesives are sold in the form of double-sided adhesive rolls. Mention may be made, as PSAs based on silicone, of the Dow Corning® adhesives, such as 2013 Adhesive, 7657 Adhesive, Q2-7735 Adhesive, Q2-7406 Adhesive, Q2-7566 Adhesive, 7355 Adhesive, 7358 Adhesive, 280A Adhesive, 282 Adhesive, 7651 Adhesive, 7652 Adhesive or 7356 Adhesive.

Without departing from the scope of the invention, the interlayer can, of course, comprise several fine sheets made of thermoplastic material of different natures, for example of different hardnesses, in order to provide an acoustic function, such as, for example, described in the publication U.S. Pat. No. 6,132,882, in particular a set of PVB fine sheets of different hardnesses. Likewise, one of the glass sheets may be thinned with respect to the thicknesses conventionally used.

The interlayer can, according to the invention, exhibit a wedge shape, in particular for the purpose of an HUD (head-up display) application. Furthermore, one of the fine sheets of the interlayer can be tinted in its bulk.

Mention may be made, as ordinary lamination interlayer, in addition to PVB, of flexible used polyurethane PU, a plasticizer-free thermoplastic, such as ethylene/vinyl acetate (EVA) copolymer, an ionomer resin. These plastics have, for example, a thickness between 0.2 mm and 1.1 mm, in particular between 0.3 and 0.7 mm.

The lamination interlayer can comprise another functional plastic film (transparent, clear or tinted), for example a film made of poly(ethylene terephthalate) PET carrying a layer which is athermal, electrically conductive, and the like; for example, there is PVB/functional film/PVB between the faces F2 and F3.

The transparent plastic film can have a thickness of between 10 and 100 μm. The transparent plastic film can be more broadly made of polyamide, polyester, polyolefin (PE: polyethylene, PP: polypropylene), polystyrene, polyvinyl chloride (PVC), polyethylene terephthalate (PET), polymethyl methacrylate (PMMA) or polycarbonate (PC). A clear film is preferred, in particular PET.

For instance, use may be made, for example, of a clear coated PET film, for example XIR from Eastman, a coextruded film made of PET/PMMA, for example of the SRF 3M® type, but also numerous other films (for example made of PC, PE, PEN, PMMA, PVC), which are visually as transparent as possible and which are not modified, in the autoclave, as regards their surface and their consistency.

An AR coating can be directly on a polymer film or on a functional underlayer (including the selective coloring layer or also a layer of hard coat type).

A selective coating can be directly on a polymer film or on a functional underlayer.

The first glass sheet can comprise, on a free face of an element under or in said traversing hole of the second sheet, a coating antireflective at at least one "working" wavelength in the infrared region in a range extending from 800 nm to 1800 nm, element chosen from:
a polymer film, forming all or part of the selective filter or bonded to the selective filter or to—a polymer film for mechanical protection which is bare or coated (with the active layer of the selective filter on the face F3 side, and the like)
the lamination interlayer (at most partially holed on the face FB side housing a selective filter as a film) which is bare or coated (with the active layer of the selective filter on face Fa)

The antireflective coating can comprise a stack of thin dielectric layers (of metal or silicon oxides and/or nitrides, for example) alternating high and low refractive indices (at the working wavelength).

The antireflective coating preferably comprises a (functional) porous silica layer, preferably a sol-gel layer.

In a first embodiment, the pores are the interstices of a noncompact stack of nanometric beads, in particular of silica, this layer being described, for example, in the document US20040258929.

In a second embodiment, the porous layer is obtained by the deposition of a condensed silica sol (silica oligomers) densified by vapors of $NH_3$ type, this layer being described, for example, in the document WO2005049757.

In a third embodiment, the porous layer can also be of sol-gel type, such as as described in the document EP 1 329 433. The porous layer can also be obtained with other known pore-forming agents: micelles of cationic surfactant molecules in solution and, optionally, in hydrolyzed form, or of anionic or nonionic surfactants, or amphiphilic molecules, for example block copolymers.

In a fourth embodiment, the porous layer can also be of sol-gel type, such as as described in the document WO2008/059170. The porous layer can thus be obtained with pore-forming agents which are preferably polymeric beads.

The antireflective coating in particular of porous silica according to the invention can have a thickness advantageously of between 10 nm and 10 μm (these limiting values being included), in particular 50 nm and 1 μm and more preferentially still between 70 and 500 nm.

The porous silica layer can exhibit closed pores of at least 20 nm, 50 nm or 80 nm; optionally, the functional layer can comprise pores with a concentration which increases in the direction of the free surface.

The pores can have an elongated shape, in particular a rice grain shape. More preferentially still, the pores can have a substantially spherical or oval shape. It is preferred for the majority of the closed pores, indeed even at least 80% of them, to have a given shape which is substantially identical, in particular elongated, substantially spherical or oval.

The antireflective coating can comprise a chemical protection underlayer, in particular with a thickness of at most 200 nm, for example, in particular a dense silica layer, by the sol-gel process, surmounted by a sol-gel porous silica functional layer.

The underlayer can be based on silica or on at least partially oxidized derivatives of silicon chosen from silicon dioxide, substoichiometric silicon oxides, or silicon oxycarbide, oxynitride or oxycarbonitride.

The underlayer proves to be of use when the underlying surface is made of soda-lime-silica glass because it acts as barrier to alkalis.

This underlayer thus advantageously comprises Si, O, optionally carbon and nitrogen. However, it can also comprise minor materials with respect to the silicon, for example metals, such as Al, Zn or Zr. The underlayer can be deposited by the sol-gel process or by pyrolysis, in particular by gas-phase pyrolysis (CVD). This latter technique makes it possible to obtain layers made of $SiO_xC_y$, or of $SiO_2$ quite easily, in particular by deposition directly on the float glass ribbon in the case of glass substrates. However, the deposition can also be carried out by a vacuum technique, for example by cathode sputtering from an (optionally doped) Si target or from a target made of silicon suboxide (in a reactive oxidizing and/or nitriding atmosphere, for example). This underlayer preferably has a thickness of at least 5 nm, in particular a thickness of between 10 nm and 200 nm, for example between 80 nm and 120 nm.

The antireflective coating can also comprise an overlayer if it does not detrimentally affect the antireflective properties.

It is also possible to put an antireflective coating also on face F1 opposite that on the face F2 side.

The antireflective coating can have the same shape as the section of the hole, for example trapezoidal or also rectangular, and the like.

Although less preferred a priori, the antireflective coating can be solely in a central zone opposite said traversing hole; it does not overstep the traversing hole and even is spaced from the edge of the traversing hole, preferably by at most 1 cm. For example, the free surface in the traversing hole exhibits a length and/or a side of at least 5 cm, 10 cm, 15 cm and preferably of at most 30 cm.

In order to limit heating in the passenger compartment or to limit the use of air conditioning, one of the first and second sheets at least (preferably the exterior glass) is tinted, and the laminated glazing can also comprise a layer which reflects or absorbs solar radiation, preferably on face F4 or on face F2 or F3, in particular a transparent electrically conductive oxide layer, "TCO layer", (on face F4) or even a stack of thin layers comprising at least one TCO layer, or stacks of thin layers comprising at least one silver layer (on F2 or F3), the or each silver layer being positioned between dielectric layers.

It is possible to simultaneously have a (silver-containing) layer on face F2 and/or F3 and a TCO layer on face F4.

The TCO layer (layer of a transparent electrically conductive oxide) is preferably a layer of fluorine-doped tin oxide ($SnO_2$:F) or a layer of mixed indium tin oxide (ITO).

The layer which reflects or absorbs solar radiation is preferably absent opposite said traversing hole.

The glazing can thus comprise, on the face F2, a functional coating which is an athermal, in particular electrically conductive, optionally heating, layer, especially a stack comprising silver, which is if necessary absent from said traversing hole at least in the central zone and along the edge of the traversing hole between the face F2 and Fa.

The interlayer (or a polymer film) can comprise metal wires, in particular heating wires, in particular anchored (face FB or FA), present or if necessary absent opposite said traversing hole of the second glass sheet.

The heating wires in particular have a thickness of less than or equal to 0.1 mm, preferably of copper, tungsten, gold, silver or aluminum or alloys of at least two of these metals.

In one embodiment, a heating zone of the glazing (optionally local, opposite said traversing hole of the second glass sheet) comprises a plurality of individual metal wires, known as "heating metal wires", which connect busbars to one another. The heating current passes through these individual metal wires. The wires are advantageously very thin, so as not to, or only to very slightly, damage the transparency of the glazing. Preferably, the metal wires have a thickness of less than or equal to 0.1 mm, in particular of between 0.02 and 0.04 mm, and ideally between 0.024 mm and 0.029 mm. The metal wires preferably contain copper, tungsten, gold, silver or aluminum or an alloy of at least two of these metals. The alloy can also contain molybdenum, rhenium, osmium, iridium, palladium or platinum. The metal wires are preferably electrically insulated.

For the glass of the first glass sheet and/or of the second glass sheet, it is preferably a glass of the soda-lime-silica type.

The interior and/or exterior glass may have undergone a chemical or heat treatment of the hardening or annealing type or a tempering (in particular for better mechanical strength) or be semitempered.

The glass of the first glass sheet and/or of the second glass sheet is preferably of the float glass type, that is to say capable of having been obtained by a process consisting in pouring the molten glass onto a bath of molten tin (float bath). "Atmosphere" and "tin" faces is understood to mean the faces which have been respectively in contact with the atmosphere prevailing in the float bath and in contact with the molten tin. The tin face contains a small superficial amount of tin which has diffused into the structure of the glass.

The face F2 can equally well be the "tin" face as the "atmosphere" face. The first glass sheet can be, for example, a soda-lime-silica glass, such as the Diamant® glass from Saint-Gobain Glass, or Optiwhite® glass from Pilkington, or B270® glass from Schott, or Sunmax® glass from AGC, or glass of other composition described in the document WO04/025334. The Planiclear® glass from Saint-Gobain Glass can also be chosen.

With ordinary natural starting materials, the total content by weight of iron oxide is of the order of 0.1% (1000 ppm). Particularly pure starting materials can be chosen in order to lower the content of iron oxide.

In the present invention, the $Fe_2O_3$ (total iron) content of the first glass sheet is preferably less than 0.015%, indeed even less than or equal to 0.012%, in particular 0.010%, in order to increase the near infrared transmission of the glass. The $Fe_2O_3$ content is preferably greater than or equal to 0.005%, in particular 0.008%, in order not to excessively penalize the cost of the glass.

In order to increase even more the transmission of the first glass sheet in the infrared region, it is possible to reduce the content of ferrous iron in favor of the content of ferric iron, thus to oxidize the iron present in the glass. Glasses having the lowest possible "redox", ideally zero or virtually zero, are thus targeted. This number can vary between 0 and 0.9, zero redox values corresponding to a fully oxidized glass.

Glasses comprising low amounts of iron oxide, in particular less than 200 ppm, indeed even less than 150 ppm, have a natural tendency to exhibit high redox values, of greater than 0.4, indeed even than 0.5. This tendency is probably due to a shift in the oxidation/reduction equilibrium of the iron as a function of the iron oxide content.

The redox of the first glass sheet is preferably greater than or equal to 0.15, and in particular between 0.2 and 0.30, in particular between 0.25 and 0.30. This is because excessively low redox values contribute to the reduction in the lifetime of the furnaces.

In the glasses according to the invention (first and even second sheet), the silica $SiO_2$ is generally kept within narrow limits for the following reasons. Above 75%, the viscosity of the glass and its aptitude for devitrification increase sharply, which makes it more difficult to melt it and to pour it onto the bath of molten tin. Below 60%, in particular 64%, the hydrolytic resistance of the glass rapidly decreases. The preferred content is between 65% and 75%, in particular between 71% and 73%.

Said first glass sheet can have a chemical composition which comprises the following constituents in a content varying within the limits by weight defined below:
$SiO_2$ 60-75%
$Al_2O_3$ 0-10%
$B_2O_3$ 0-5%, preferably 0%
CaO 5-15%
MgO 0-10%
$Na_2O$ 5-20%
$K_2O$ 0-10%
BaO 0-5%, preferably 0%,
$SO_3$ 0.1-0.4%
$Fe_2O_3$ (total iron) 0% to 0.015%,
redox 0.1-0.3.

Throughout the text, the percentages are percentages by weight.

The glass sheets are preferably formed by floating on a bath of tin. Other types of forming process can be employed, such as drawing processes, down-draw process, rolling process, Fourcault process, and the like.

The glass composition of the first glass sheet can comprise, in addition to the unavoidable impurities contained in particular in the starting materials, a small proportion (up to 1%) of other constituents, for example agents aiding the melting or the refining of the glass (CI, and the like), or also elements originating from the dissolution of refractories used in the construction of the furnaces (for example $ZrO_2$). For the reasons already mentioned, the composition according to the invention preferably does not comprise oxides such as $Sb_2O_3$, $As_2O_3$ or $CeO_2$.

The composition of the first glass sheet preferably does not comprise any agent which absorbs infrared radiation (in particular for a wavelength of between 800 and 1800 nm). In particular, the composition according to the invention preferably does not contain any of the following agents: oxides of transition elements, such as CoO, CuO, $Cr_2O_3$, NiO, $MnO_2$ or $V_2O_5$, oxides of rare earth metals, such as $CeO_2$, $La_2O_3$, $Nd_2O_3$ or $Er_2O_3$, or else coloring agents in the elemental state, such as Se, Ag or Cu. The other agents preferably excluded also include the oxides of the following elements: Sc, Y, Pr, Sm, Eu, Gd, Tb, Dy, Ho, Tm, Yb or Lu. These agents very often have an undesirable very powerful coloring effect, which is apparent at very low contents, sometimes of the order of a few ppm or less (1 ppm=0.0001%). Their presence thus very greatly reduces the transmission of the glass.

Preferably, the first glass sheet exhibits a chemical composition which comprises the following constituents in a content varying within the limits by weight defined below:
$SiO_2$ 60-75%
$Al_2O_3$ 0-10%
$B_2O_3$ 0-5%, preferably 0%
CaO 5-15%
MgO 0-10%
$Na_2O$ 5-20%
$K_2O$ 0-10%
BaO 0-5%, preferably 0%,
$SO_3$ >0.2-0.4%
$Fe_2O_3$ (total iron) 0% to 0.015%,
redox 0.2-0.30.

The first glass sheet can exhibit a chemical composition which comprises the following constituents in a content varying within the limits by weight defined below:
$SiO_2$ 60-75%
$Al_2O_3$ 0-10%
$B_2O_3$ 0-5%, preferably 0%
CaO 5-15%
MgO 0-10%
$Na_2O$ 5-20%
$K_2O$ 0-10%
BaO 0-5%, preferably 0%,
$SO_3$ 0.1-0.4%
$Fe_2O_3$ (total iron) 0% to 0.02%,
redox 0.15-0.3.

In the present invention, the $Fe_2O_3$ (total iron) content is preferably less than 0.015%, indeed even less than or equal to 0.012%, in particular 0.010%, this being in order to increase the near infrared transmission of the glass. The $Fe_2O_3$ content is preferably greater than or equal to 0.005%, in particular 0.008%, in order not to excessively penalize the cost of the glass.

The redox is preferably greater than or equal to 0.15, and in particular between 0.2 and 0.30, in particular between 0.25 and 0.30. This is because excessively low redox values contribute to the reduction in the lifetime of the furnaces.

In the glasses according to the invention, the silica $SiO_2$ is generally kept within narrow limits for the following reasons. Above 75%, the viscosity of the glass and its aptitude for devitrification increase sharply, which makes it more difficult to melt it and to pour it onto the bath of molten tin. Below 60%, in particular 64%, the hydrolytic resistance of the glass rapidly decreases. The preferred content is between 65% and 75%, in particular between 71% and 73%.

Other preferred compositions according to the invention are reproduced below:
  $SiO_2$ 65-75%
  $Al_2O_3$ 0-3%
  CaO 7-12%
  MgO 2-5%
  $Na_2O$ 10-15%
  $K_2O$ 0-5%
  $SO_3$ 0.1-0.3%
  $Fe_2O_3$ (total iron) 0% to less than 0.015%,
  redox 0.1-0.3.

Other preferred compositions according to the invention are reproduced below:
  $SiO_2$ 65-75%
  $Al_2O_3$ 0-5%
  CaO 7-12%
  MgO 1-5%
  $Na_2O$ 10-15%
  $K_2O$ 0-5%
  $SO_3$ 0.2-0.4%
  $Fe_2O_3$ (total iron) 0% to less than 0.015%,
  redox 0.1-0.3.

Naturally, the most desired application is for the glazing to be a windshield of a road vehicle (automobile) or even a (moderate speed) rail vehicle.

The invention also relates to a vehicle, in particular an autonomous or semiautonomous vehicle, incorporating the vehicle glazing according to the invention, in particular forming a windshield.

The invention also relates to a device, in particular a (road) vehicle, which comprises:
  the glazing as described above
  a system for infrared viewing at said working wavelength, such as LIDAR, positioned in the passenger compartment behind said glazing so as to send and/or receive radiation after passing through the first glass sheet at the level of said traversing hole.

The invention relates to a process for the manufacture of said laminated glazing as described above, such that:
  before laminating, opposite said traversing hole and in a border zone of said traversing hole, the face F2 comprising said safety element (according to the configuration a), in particular with a total thickness of at least 0.2 mm and even of at most 0.15 mm, the lamination interlayer, in particular PVB, with a single fine sheet or plurality of fine sheets, comprises an "interlayer" traversing hole opposite said traversing hole of the second sheet (and extending into a border zone of said traversing hole); after said laminating, the traversing hole is equal to or wider than the traversing hole or oversteps by at most 5 mm into the traversing hole of the second sheet
  said safety element is in said interlayer hole
  and, in the border zone of said traversing hole, said rear band is present between the safety element and the face F3
  preferably after said laminating
  at the level of said interlayer hole, the safety element is in adhesive contact with the interlayer (by its edge face) and/or the rear band is in adhesive contact with the interlayer, optionally oversteps by at most 5 mm into the traversing hole of the second sheet.

The invention relates to a process for the manufacture of said laminated glazing as described above, such that, before laminating, opposite said traversing hole and in a border zone of said traversing hole, the face F2 comprising said safety element according to a), in particular with a total thickness of at least 0.2 mm, the lamination interlayer, in particular PVB, comprises a first fine sheet or a first plurality of fine sheets, a first "interlayer" traversing hole opposite said traversing hole of the second sheet and extending into a border zone of said traversing hole
  said safety element is in said first interlayer hole
  the lamination interlayer comprises a second fine sheet exhibiting a second interlayer hole which is not as broad as the first interlayer hole and which extends into the border zone of said traversing hole between the safety element and the face F3
  preferably after said laminating
  at the level of said first interlayer hole, the safety element is in adhesive contact with the interlayer (by its edge face)
  the second interlayer hole optionally oversteps by at most 5 mm into the traversing hole of the second sheet.

The invention relates to a process for the manufacture of said laminated glazing as described above, such that:
  before laminating, opposite said traversing hole and in a border zone of said traversing hole, the face F2 comprising said safety element according to a), in particular with a total thickness of at least 0.2 mm, the lamination interlayer, in particular PVB, comprises a first fine sheet or a first plurality of fine sheets, a first "interlayer" traversing hole opposite said traversing hole of the second sheet
  and, in the border zone of said traversing hole, said safety element is in said interlayer hole
  the lamination interlayer comprises a second fine sheet exhibiting a second interlayer hole which is not as broad as the first interlayer hole and in the border zone of said traversing hole between the safety element and the face F3
  preferably after said laminating
  at the level of said first interlayer hole, the safety element is in adhesive contact with the interlayer
  the second interlayer hole optionally oversteps by at most 5 mm into the traversing hole of the second sheet.

In addition, before the formation of the structure to be laminated, the preassembling can be carried out of said safety element comprising said front band and/or said rear band or according to the configuration b) with said rear band.

In order to simplify and accelerate the manufacture of the glazing, it may be preferred to use a safety element preassembled by adhesive bonding or adhesive contact off the lamination line.

For example, PVB front band/polymer film(s) are preassembled and the assembly can even be placed and bonded on an interlayer PVB fine sheet—(holed or not under said traversing hole) or on a PVB rear band, for example by local heating.

In particular, it is possible to form a following element preassembled before laminating: front PVB fine sheet (face F2 side)/polymer film(s) and with a holed PVB fine sheet bonded to the front fine sheet.

In addition, before the formation of the structure to be laminated, the preassembling can be carried out of said safety element according to the configuration b), in particular with FA having a blind hole for housing underlying polymer film(s) and/or with FB having a blind hole for housing at least first polymer film.

Certain advantageous but nonlimiting embodiments of the present invention are described below, which can, of course, be combined with one another, if appropriate.

FIG. 1 diagrammatically represents, in partial sectional view, a windshield 100 in a first embodiment of the invention with an infrared viewing system 7, such as a LIDAR.

FIG. 1' is a detailed view of FIG. 1.

Figure 1A:
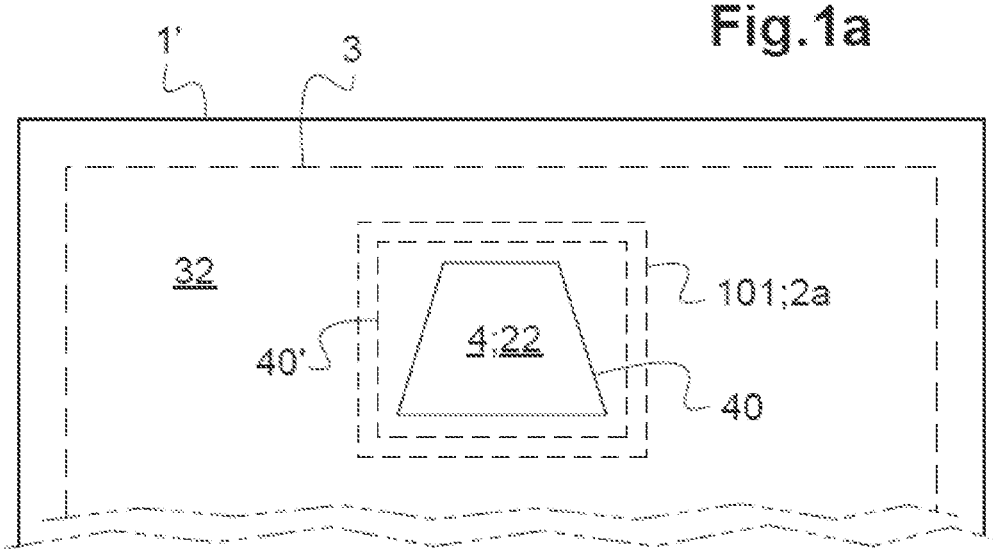

FIG. 1a is a partial front view of the windshield (passenger compartment side) of FIG. 1.

Figure 1B:
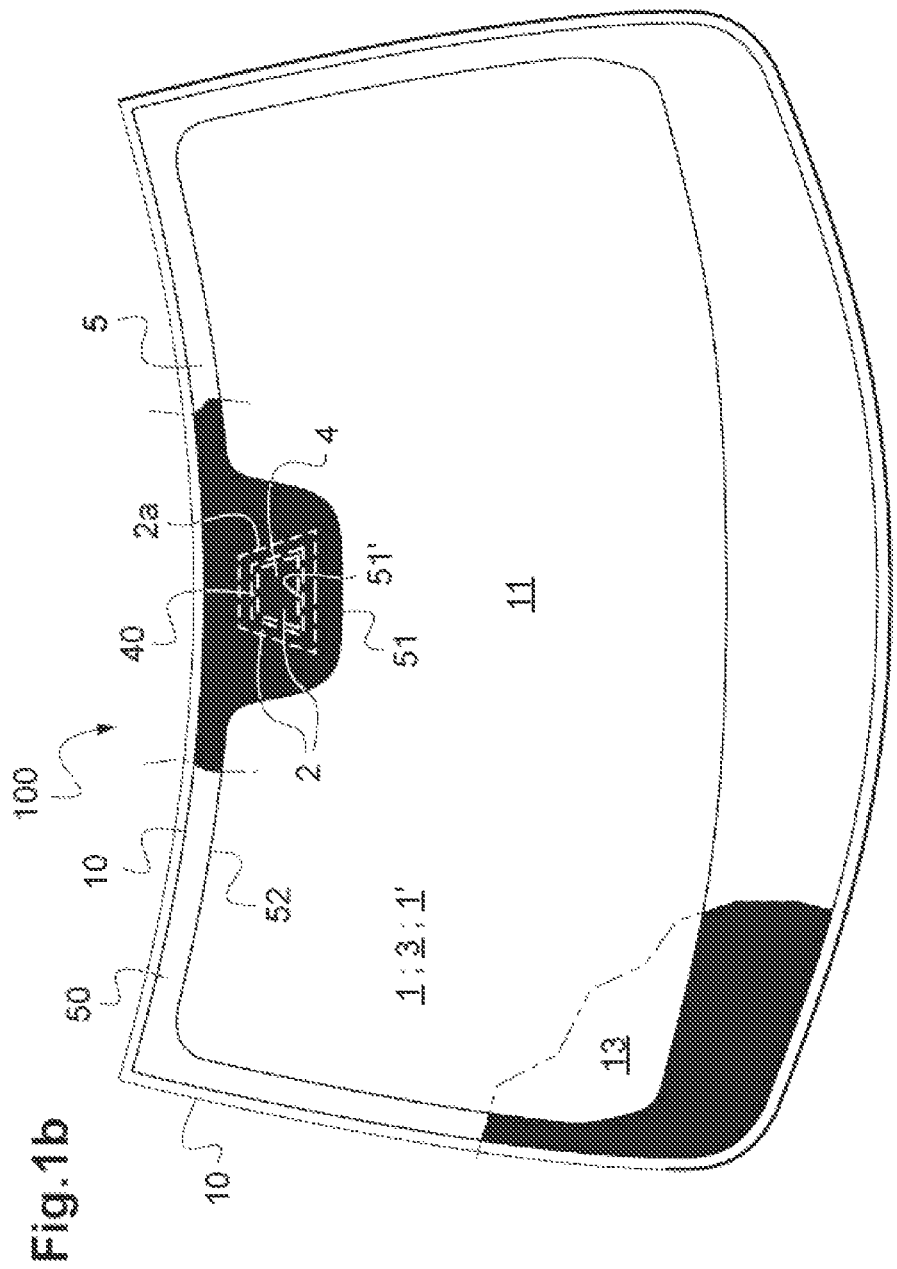

FIG. 1b diagrammatically represents, in front view (exterior side), the windshield 100 of FIG. 1.

FIG. 1c diagrammatically represents, in front view (exterior side), the windshield 100 of FIG. 1 in an alternative form.

Figure 1D:
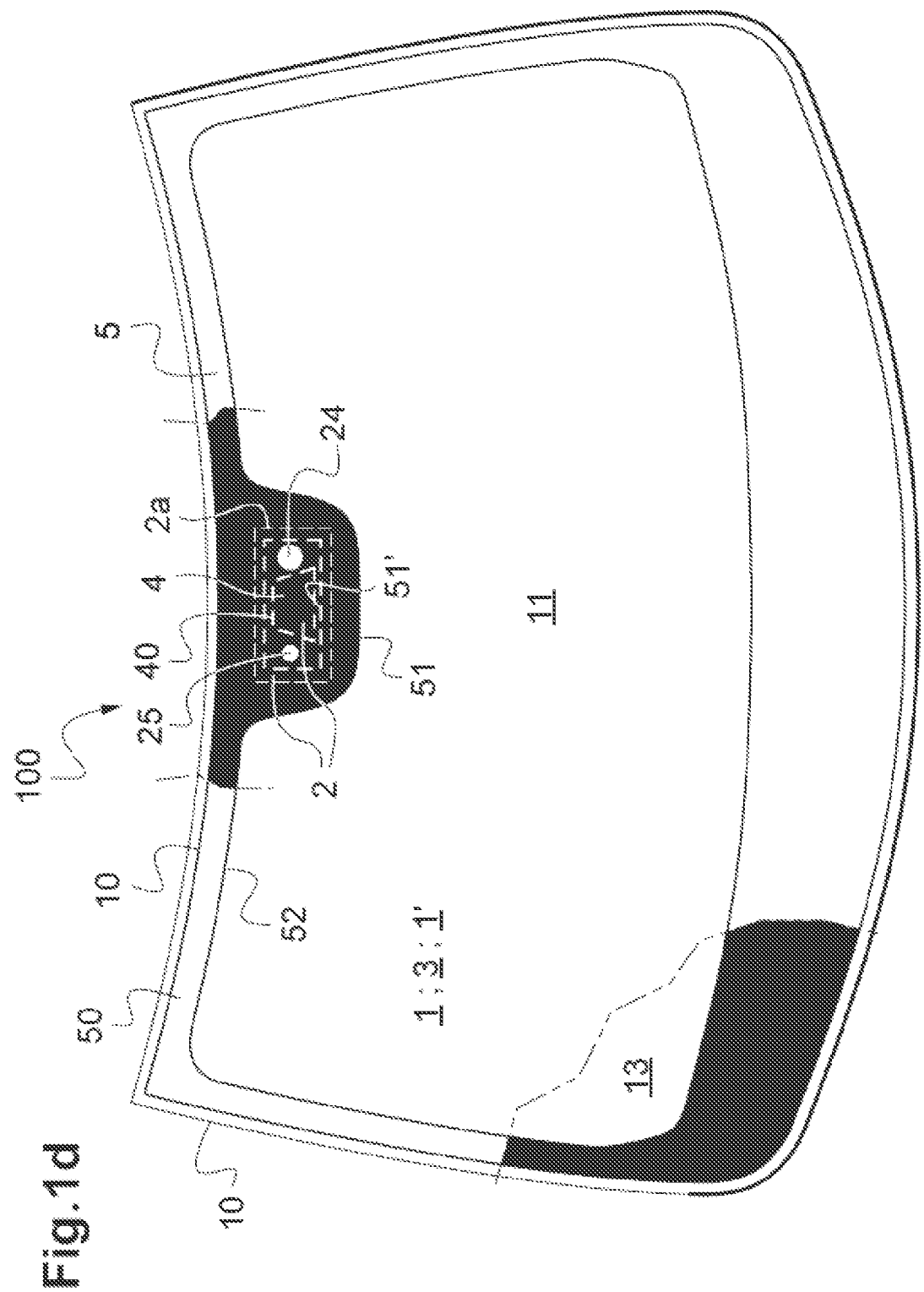

FIG. 1d diagrammatically represents, in front view (exterior side), the windshield 100 of FIG. 1 in an alternative form.

FIG. 1e diagrammatically represents, in front view (exterior side), the windshield 100 of FIG. 1 in an alternative form.

FIG. 2 diagrammatically represents, in partial and detailed sectional view, around the traversing hole of a windshield 200 in a second embodiment of the invention.

Figure 3:
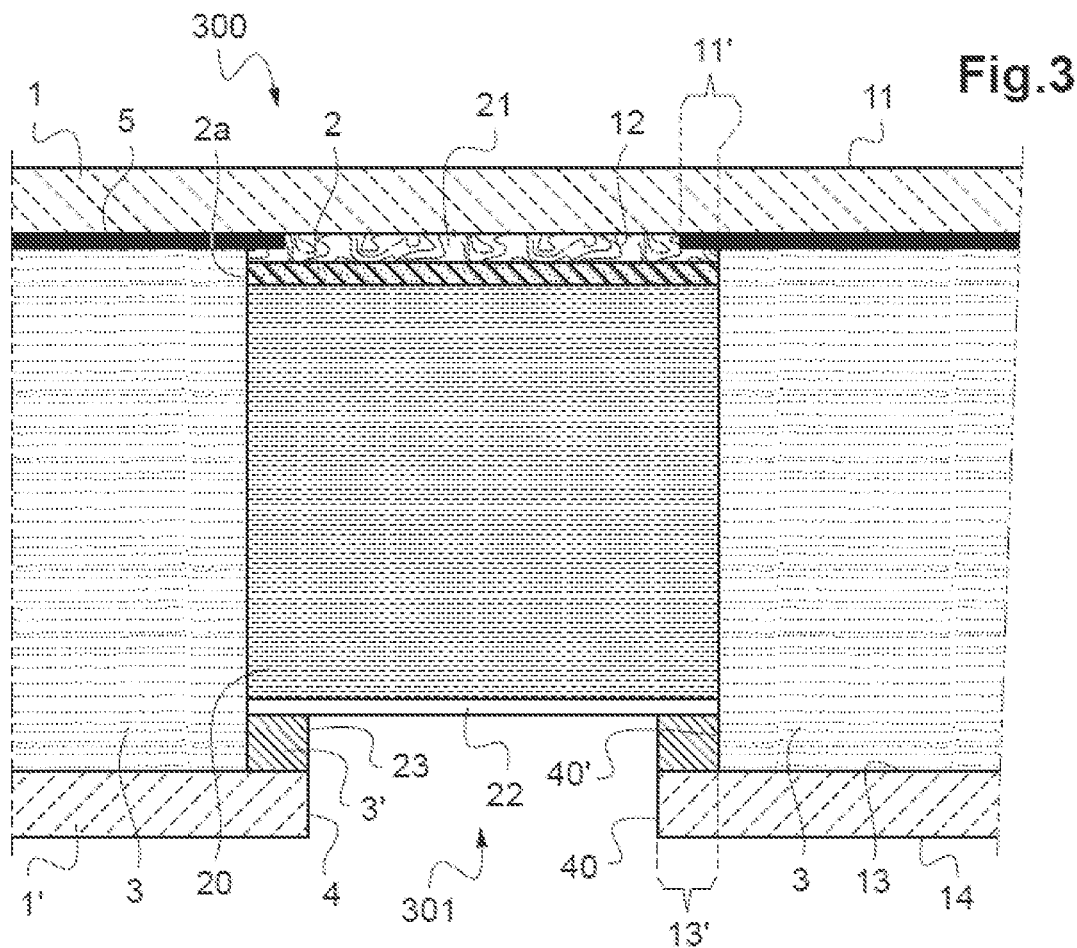
Figure 3:
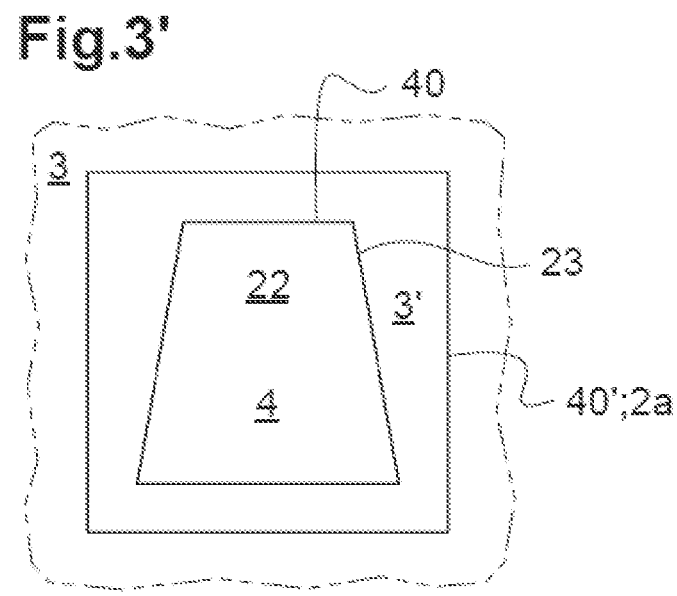

FIG. 3 diagrammatically represents, in partial and detailed sectional view, around the traversing hole of a windshield 300 in a third embodiment of the invention.

FIG. 3' diagrammatically represents, in front view (passenger compartment side), the windshield 300 of FIG. 3.

Figure 4:
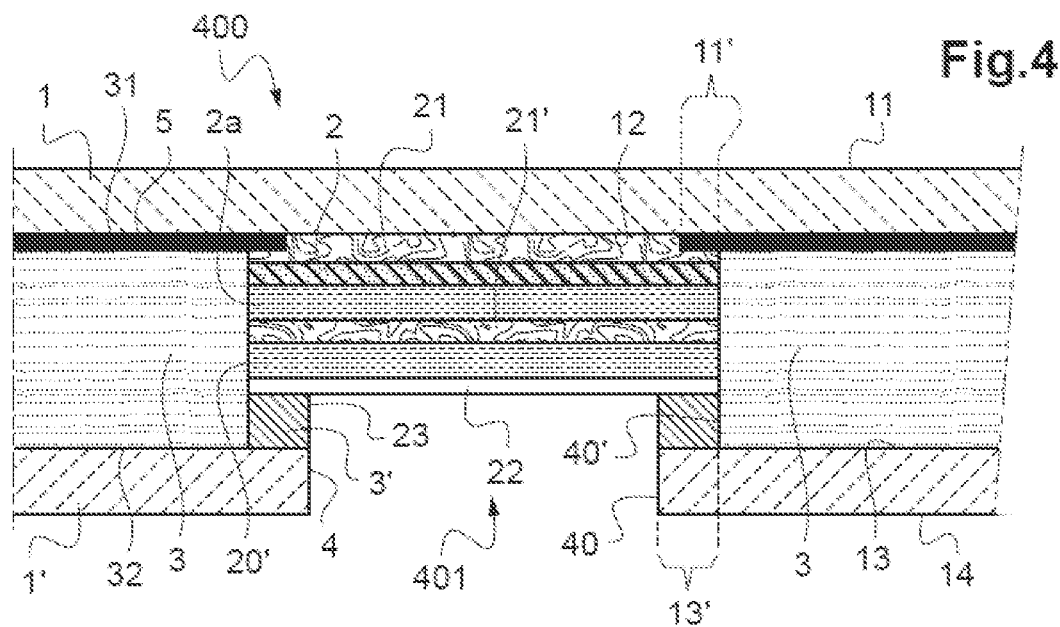

FIG. 4 diagrammatically represents, in partial and detailed sectional view, around the traversing hole of a windshield 400 in a fourth embodiment of the invention.

Figure 5:
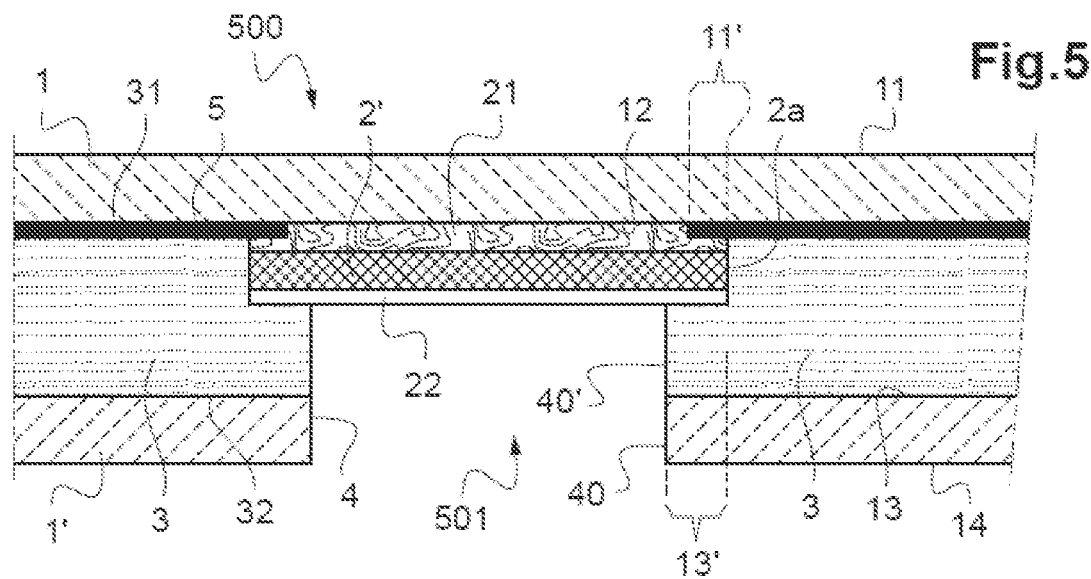

FIG. 5 diagrammatically represents, in partial and detailed sectional view, around the traversing hole of a windshield 500 in a fifth embodiment of the invention.

Figure 6:
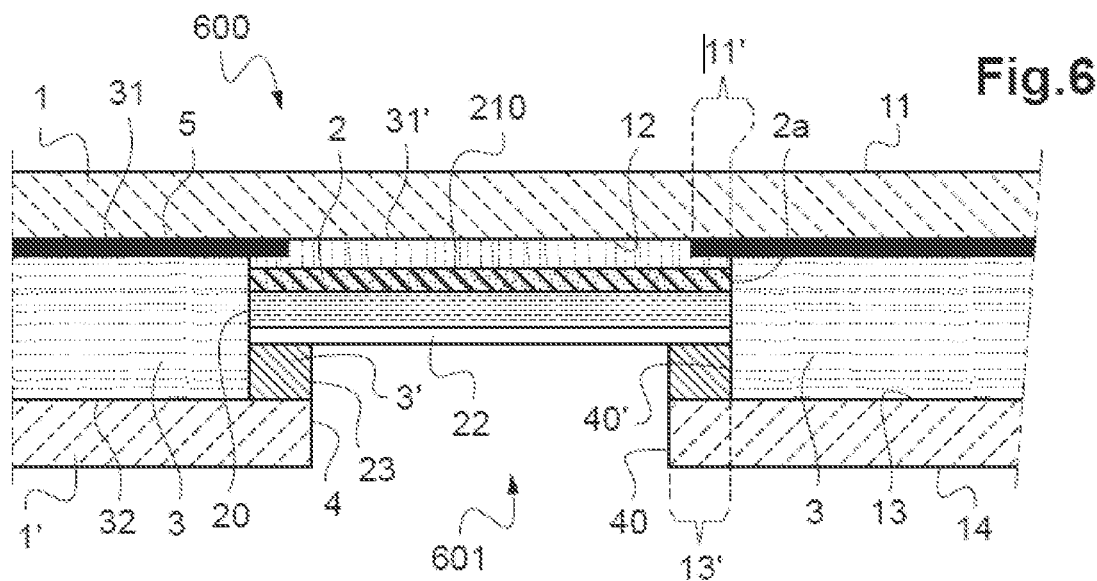

FIG. 6 diagrammatically represents, in partial and detailed sectional view, around the traversing hole of a windshield 600 in a sixth embodiment of the invention.

Figure 6A:
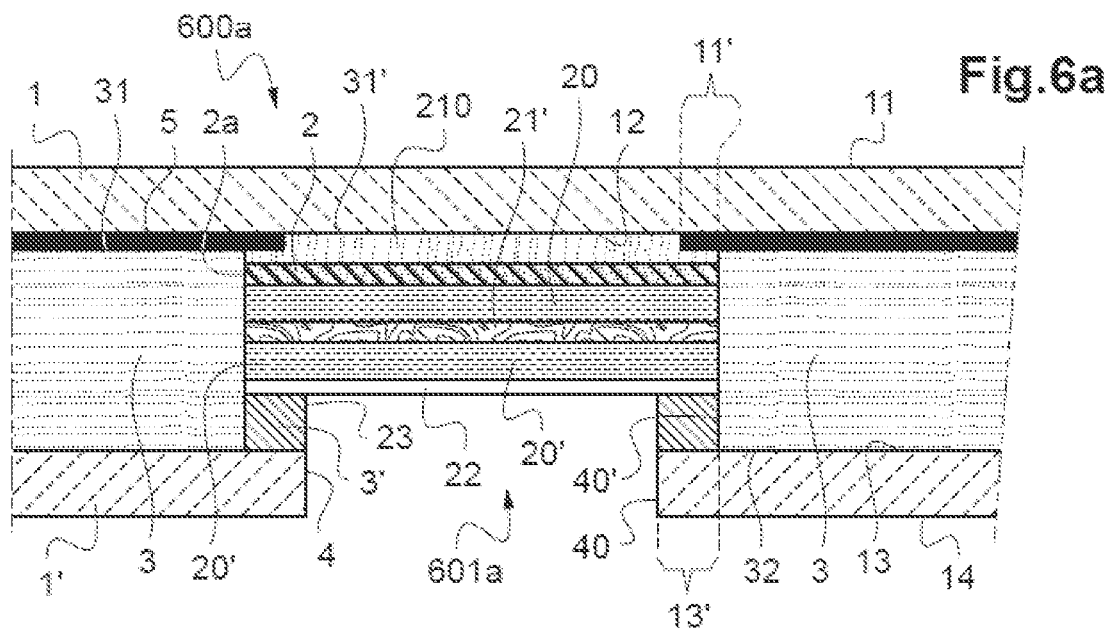

FIG. 6a diagrammatically represents, in partial and detailed sectional view, around the traversing hole of a windshield 600a in a first alternative form of the sixth embodiment of the invention.

FIG. 6b diagrammatically represents, in partial and detailed sectional view, around the traversing hole of a windshield 600b in a second alternative form of the sixth embodiment of the invention.

FIG. 6c diagrammatically represents, in partial and detailed sectional view, around the traversing hole of a windshield 600c in a third alternative form of the sixth embodiment of the invention.

FIG. 7 diagrammatically represents, in partial and detailed sectional view, around the traversing hole of a windshield 700 in a seventh embodiment of the invention.

FIG. 7' is a partial front view of the windshield (passenger compartment side) of FIG. 7.

FIG. 8 diagrammatically represents, in partial and detailed sectional view, around the traversing hole of a windshield 800 in an eighth embodiment of the invention.

Figure 9:
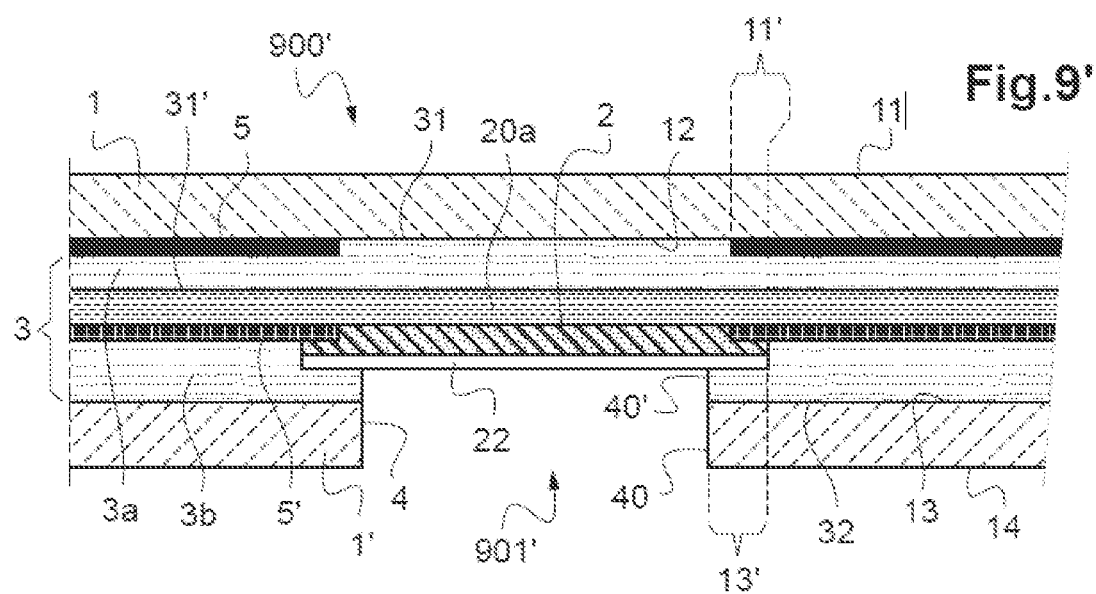

FIG. 9 diagrammatically represents, in partial and detailed sectional view, around the traversing hole of a windshield 900 in a ninth embodiment of the invention.

FIG. 9' diagrammatically represents, in partial and detailed sectional view, around the traversing hole of a windshield 900' in an alternative form of the ninth embodiment of the invention.

The figures are not to scale.

FIG. 1 diagrammatically represents a windshield 100 according to the invention, in section with a system for infrared viewing 7, such as a LIDAR, at 850 nm or 905 nm or 1550 nm. FIG. 1' is a detailed view of FIG. 1 and the view 1a a partial front view of the windshield of FIG. 1. FIG. 1' is a detailed view of FIG. 1. FIG. 1a is a partial front view of the windshield (passenger compartment side) of FIG. 1.

FIG. 1b diagrammatically represents, in front view (exterior side), the windshield 100 of FIG. 1.

This viewing system 7 is placed behind the windshield facing a zone which is preferably located in the central and upper part of the windshield. In this zone, the infrared viewing system 7 is oriented with a certain angle with respect to the surface of the windshield (face F2). In particular, the LIDAR can be oriented directly toward the image capture zone, along a direction parallel or close to parallel with the ground, that is to say slightly inclined toward the road.

The windshield is a laminated glazing comprising:
- an external glass sheet 1, with exterior face "F1" 11 and interior face "F2" 12
- and an internal glass sheet 1' (or, in an alternative form, plastic sheet), for example with a thickness of 1.6 mm or even less, with exterior face "F3" 13 and interior face "F4" 14 on the passenger compartment side
- the two glass sheets being connected to each other by an interlayer made of thermoplastic material 3, generally made of polyvinyl butyral (PVB), which is preferably clear, with a submillimetric thickness, optionally exhibiting a cross section which decreases in wedge shape from the top toward the bottom of the laminated glazing, for example a PVB (RC41 from Solutia or from Eastman) with a thickness of approximately 0.76 mm, and/or, in an alternative form, if necessary, an acoustic (three-layer or four-layer) PVB, for example with a thickness of approximately 0.81 mm, for example an interlayer made of three PVB fine sheets or also PVB/functional PET (solar control, and the like)/PVB trilayer.

In a conventional and well-known way, the windshield is obtained by hot lamination of the elements 1, 1' and 3. For example, a clear PVB of 0.76 mm is chosen. If the PVB opposite the traversing hole is retained, it is preferred to be the most transparent at the working wavelength.

The first glass sheet 1, in particular based on silica, soda-lime, soda-lime-silica (preferably), aluminosilicate or borosilicate, exhibits a content by weight of total iron oxide (expressed in the form of $Fe_2O_3$) of at most 0.05% (500 ppm), preferably of at most 0.03% (300 ppm) and of at most 0.015% (150 ppm) and in particular of greater than or equal to 0.005%. The first glass sheet can exhibit a redox of greater than or equal to 0.15, and in particular of between 0.2 and 0.30, in particular between 0.25 and 0.30.

In particular, an Optiwhite glass of 1.95 mm is chosen.

The second glass sheet 1', in particular based on silica, soda-lime, preferably soda-lime-silica (and like the first glass sheet), indeed even aluminosilicate, or borosilicate, exhibits a content by weight of total iron oxide of at least 0.4% and preferably of at most 1.5%. The second glass sheet can exhibit a redox between 0.22 and 0.35 or 0.30. Mention may in particular be made of the glasses of the applicant company named TSAnx (0.5 to 0.6% of iron), TSA2+, TSA3+ (0.8 to 0.9% of iron), TSA4+ (1% of iron) or TSA5+, which are for example green. A TSA3+ glass of 1.6 mm is chosen.

The first glass sheet comprises, on the face F2, a stack 101 transparent at at least one "working" wavelength in the infrared region of between 800 nm and 1800 nm, in particular between 850 nm and 1600 nm, with a surface which is free (not covered by the lamination interlayer and the second glass or plastic sheet), by means of a traversing hole 4 in the thickness of the second glass or plastic sheet, thus a hole delimited by the walls 40, and in this instance of an optional "interlayer" traversing hole, delimited by the walls 40'.

The stack 101 forms a safety element.

According to the invention, in a peripheral central region along the upper longitudinal edge, the windshield thus comprises a traversing hole 4 in the thickness of the second glass or plastic sheet 1' and optionally of the lamination interlayer 3. The infrared viewing system 7 is opposite the traversing hole 4.

As shown in FIGS. 1a to 1e, the hole 4 is in this instance a closed hole (framed by the wall of the glass sheet), thus within the glazing in particular—of trapezoidal or rectangular section (FIG. 1e)—comprising:
- a first "upper" large side or longitudinal edge closest to the edge face of the upper longitudinal edge of the glazing 10—parallel to this edge face with a length of at most 20 cm, for example 10.6 cm, and spaced by at least 5 cm or 6 cm from the edge face
- a second "lower" large side or longitudinal edge (furthest from the edge face of the upper longitudinal edge 10, close to the central zone) parallel to the first large side with a length of at most 25 cm or 20 cm, for example 17.5 cm, and spaced by at least 5 cm or 6 cm from the edge face
- with a height (between the large sides) of at least 5 cm, in this instance of 10 cm.

The traversing hole can be circular, in particular if it has a diameter of at most 10 cm, 8, 5 or 2 cm.

The traversing hole 4 can alternatively be a notch, thus an emerging traversing hole preferably on the roof side.

The traversing hole 4 can be in another region of the windshield 100 (cf. offset toward a lateral edge 10; cf. FIG. 1e, which exhibits two possible zones for the hole 4), or even in another glazing of the vehicle, in particular the back window.

The stack 101 is also local. In this instance, it has a rectangular shape present opposite said hole 4 and in a border zone of said hole, for example its edges overstepping by at most 10 mm the walls delimiting the hole 4 between the face F2 and F3.

The windshield 100 comprises, on the face F2 12, an opaque masking layer, which is for example black, 5, such as an enamel layer or a lacquer, forming a peripheral frame of the windshield (or of the back window) and in the peripheral zone with the traversing hole, in this instance central zone with more extended masking, it comprises a gap 51' large enough not to hamper the performance qualities of the LIDAR 7 but capable of masking the housing 8 (plastic, metal, and the like) of the LIDAR 7.

The housing 8 and even the LIDAR can be fixed (adhesively bonded, and the like) to a plate 8' holed in line with said hole on the face F4 by an adhesive 6 (and optionally to the roof 9).

In this instance, the stack 101 is on the face F2 and slightly overlaps the masking layer 5 in the border region of the traversing hole 4 (zone 11') in order to mask its edges.

The masking layer has a top edge 50 and a bottom edge 51 in the central zone. The bottom edge 52 of the masking layer 5 on either side of the central zone is closer to the edge face 10.

The stack 101 comprises, starting from the face 12 F2:
- a coloring layer 2 forming a selective filter for hiding the hole 4 from the outside by filling in at least the gap 51' and beyond
- a PSA adhesive 21, for example acrylate, deposited by the liquid route (with withdrawn protective liner) with a thickness of 10 µm
- a PET film 20 which is transparent with a coating 22 which is antireflective at the working wavelength.

For example, an AR film named Diamox AR1617 from Diamond Coatings is chosen.

Alternatively, a breakage-prevention film can also be chosen, such as the SolarGard film named Armorcoat 7 Mil.

The coloring layer 2 is made of a compound, for example polymer compound, comprising an organic matrix and a coloring agent, preferably organic coloring agent, dispersed in said matrix, said coloring agent absorbing the light located in said visible region and being transparent at said working wavelength.

The coloring agent is chosen, for example, from Sudan Black BR or Nigrosine Solvent Black 5, and is preferably Sudan Black BR.

The compound is preferably chosen from monomers, oligomers, or polymers comprising at least one methacrylate functional group, epoxides, a varnish consisting of dispersed PVB particles, latex, polyurethane or acrylate.

For the effectiveness of the selective filter as layer, it is possible to vary the layer thickness or the percentage by weight of coloring agent.

The selective filter (as layer) can be less than 100 µm or even 30 µm (varnish, and the like).

Opposite said traversing hole, the laminated glazing exhibits:
- a total transmission of at least 80%, 90% or 95% at the working wavelength, measured at 90°
- a total transmission of at most 10%, 5%, 1% or 0.1% in the visible region.

As shown in FIGS. 1b to 1e, seen from the outside, there thus appears to be a black (or of another color) continuous masking layer in the rearview mirror zone (or along the edge) and on either side in the rearview mirror zone in the form of a masking band 50.

The selective filter is defined by an $L^*1$, $a^*1$, $b^*1$, defined in the $L^*a^*b^*$ CIE 1976 chromatic space. The masking layer of color C1 also is defined by an $L^*2$, $a^*2$, $b^*2$ with a colorimetric difference $\Delta E^*$ given by the following formula:

$$\Delta E^* = \sqrt{(\Delta L^{*2} + \Delta a^{*2} + \Delta b^{*2})}.$$

Preferably $\Delta E^* < 4$, better still $\Delta E^* < 2$ (the human eye detects with difficulty), better still $\Delta E^* < 1$ (the human eye does not detect).

The stack 101 can have the same shape 2a as the hole 4: trapezoidal (FIG. 1b) or rectangular (FIG. 1e, first case along the edge, FIGS. 1c and 1d) encompassing the hole (trapezoidal or, in an alternative form not shown, circular).

The gap 51' can have the same shape as the hole 4: trapezoidal (FIG. 1b, 1c) or rectangular (FIG. 1d), encompassing the hole (trapezoidal or, in an alternative form not shown, circular).

The gap 51' is shown closed but can be emerging and filled in by the coloring layer 2.

In FIG. 1e, the masking layer 5 does not comprise a gap (or even excessive thickness to form the camera zone. The coloring layer 2 is nearby, preferably slightly spaced, to maintain, if necessary, a continuity in masking.

The zone of the coloring layer can be sufficiently extended beyond said traversing hole to be used in a camera zone comprising one or more sensors.

In this case, as shown in FIGS. 1*d* and 1*e* for a requirement of transparency in the visible region of these sensors, the stack 101 (or at least the layer 2) is "patterned" (structured), thus exhibits, for example, a first opening 24 for a visible camera and another, smaller, opening 25 for the thermal camera or also other sensors (rain, exterior brightness, and the like).

The windshield 100 can comprise a set of virtually invisible metal wires, for example of 50 μm, which are installed, for example, on the face FA or FB of the lamination interlayer 3 (over the entire surface), in the form of lines which are or are not straight. These wires can be absent from the traversing hole 4 if they harm the LIDAR.

In the detailed view (FIG. 1'), it is seen that the face FA covers the border of the stack under the border zone of the traversing hole in a zone 13'. The traversing hole of the lamination interlayer can be reduced by a few mm by yielding.

During the manufacture, if the stack 101 is thin, for example of at most 0.2 mm, the PVB with traversing hole (for example 0.38 mm or 0.76 mm) is on the stack and by yielding it comes into adhesive contact with the face F2 and the edge face 2*a* of the stack (lateral contact).

The presence of a film opposite said traversing hole forms a safety element.

FIG. 2 diagrammatically represents, in partial and detailed sectional view, around the traversing hole of a windshield 200 in a second embodiment of the invention.

The stack 201 differs from the preceding 101 in that it comprises a selective film, that is to say a transparent PET film 20, carrying, on one at least of its main faces, in this instance oriented toward F2, the coloring layer 2 already described.

This selective film is adhesively bonded, by an acrylate PSA adhesive 21, to the face F2.

The presence of a film opposite said traversing hole forms a safety element.

On the opposite face (oriented toward the face F3), the PET film 20 preferably comprises an AR coating 22, for example by alternation of high and low index layer or also a porous, in particular sol-gel, layer of silica with hollow particles (of silica, and the like).

If the stack is fairly thin (of at most 200 μm, for example), it does not create an excessive thickness troublesome at the time of the laminating.

If the stack is thicker, recourse may be had to a first PVB with a first traversing hole and to a second PVB (in particular thinner) having a second traversing hole which is not as broad in order to cover the border of the AR layer 22 (without notably overstepping opposite said traversing hole of the second sheet).

FIG. 3 diagrammatically represents, in partial and detailed sectional view, around the traversing hole of a windshield 300 in a third embodiment of the invention.

FIG. 3' diagrammatically represents, in front view (passenger compartment side), the windshield 300 of FIG. 3.

The stack 301 differs from the preceding 201 in that it is thicker; for example, the film 20 has a reinforced breakage-prevention function and is thick, of at least 300 or 400 μm.

It also differs from the preceding stack in that it is bonded in the border region of the traversing hole not by PVB but by a rear band 3', which is for example thin, of less than 0.2 mm, with an edge face on the traversing hole side 23, for example plasticizer-free PVB, over the entire circumference of the traversing hole and in adhesive contact via its internal edge face with the PVB 3 (interface discernible, for example). The front band has, for example, a rectangular outline encompassing the trapezoidal (or circular) traversing hole.

Selective film/band can be preassembled before formation of the laminated structure.

FIG. 4 diagrammatically represents, in partial and detailed sectional view, around the traversing hole of a windshield 400 in a fourth embodiment of the invention.

The stack 401 differs from the stack 301 in that it comprises a stack of polymer films adhesively bonded to the face F2 12 and adhesively bonded together by a PSA adhesive 21, 21':
 the first film is selective
 the second film is an AR film 20', 22

Alternatively, a breakage-prevention film and a selective (filter) film are chosen.

Alternatively, a breakage-prevention film and an AR film are chosen.

An example of breakage-prevention film is the Solar Gard film named Armorcoat 7 Mil.

The PVB has a main face FA 31, F2 12 side, and FB 32, F3 13 side.

FIG. 5 diagrammatically represents, in partial and detailed sectional view, around the traversing hole of a windshield 500 in a fifth embodiment of the invention.

The stack 501 differs from the stack 201 in that the first film is selective by being bulk-tinted. It may be desired to retain the coloring layer, if need be.

Alternatively, a rear band is used, as for the preceding stack 401.

FIG. 6 diagrammatically represents, in partial and detailed sectional view, around the traversing hole of a windshield 600 in a sixth embodiment of the invention.

The stack 601 differs from the stack 201 in that the first selective film is adhesively bonded to the face F2 by a front band 210, which is for example thin, of less than 0.2 mm, for example plasticizer-free PVB. The front band has a face 31' in adhesive contact with the face 12.

It is possible to choose the same PVB (type) for front band and rear band 3'.

FIG. 6*a* diagrammatically represents, in partial and detailed sectional view, around the traversing hole of a windshield 600*a* in a first alternative form of the sixth embodiment of the invention.

The stack 601*a* differs from the stack 601 in that it comprises two films adhesively bonded by a PSA adhesive 21': the selective film 20 and then the AR film 20', 22.

FIG. 6*b* diagrammatically represents, in partial and detailed sectional view, around the traversing hole of a windshield 600*b* in a second alternative form of the sixth embodiment of the invention.

The stack 601*b* differs from the stack 601 in that it comprises a bulk-tinted selective film 2' still with the anti-reflective coating 22 and the front band 210.

FIG. 6*c* diagrammatically represents, in partial and detailed sectional view, around the traversing hole of a windshield 600*c* in a third alternative form of the sixth embodiment of the invention.

The stack 601*c* differs from the stack 601 in that it comprises a film with AR coating 22 with, on the face, face F2 12 side, the coloring layer 2.

FIG. 7 diagrammatically represents, in partial and detailed sectional view, around the traversing hole of a windshield 700 in a seventh embodiment of the invention.

FIG. 7' is a partial front view of the windshield (passenger compartment side) of FIG. 7.

The PVB interlayer 3 is retained in the zone under said traversing hole. In this zone and along the edge, the face FA 31 is in contact with the coloring layer 2 deposited on the face F2 12 or on the face FA (ink). In this zone and along the edge, the face FB 32 is in adhesive contact with an AR film 22 carrying a rear band 3' with an edge face 23 and in adhesive contact with the face F3 13 and optionally overstepping the edge face 2b of the film 20'.

The coloring layer 2 can be replaced by a selective film or even a stack of films adhesively bonded together (including the selective film), and, if necessary, a blind hole can be made on the face FA to prevent an excessive thickness caused by the film(s).

FIG. 8 diagrammatically represents, in partial and detailed sectional view, around the traversing hole of a windshield 800 in an eighth embodiment of the invention.

The stack 801 differs from the stack 701 in that the coloring layer 2 is moved face FB side under the film 20. The rear band is not overstepping.

FIG. 9 diagrammatically represents, in partial and detailed sectional view, around the traversing hole of a windshield 900 in a ninth embodiment of the invention.

The stack 901 is the same as the stack 801 but the PVB is a PVB1 3b with an edge face 40' on the side of the hole of the glass and the face 32/functional PET 20a with a solar control layer 5'/PVB2 3a with an edge face 40" on the side of the hole of the glass and the face 31 trilayer, PVB trilayer holed in line with said traversing hole and its border on the side of the face FB and below the PET 20.

A rear band might be added for greater sturdiness.

FIG. 9' diagrammatically represents, in partial and detailed sectional view, around the traversing hole of a windshield 900' in an alternative form of the ninth embodiment of the invention.

The windshield 900' differs from the windshield 900 in that only the PVB2 3b and the solar control layer 5' (face FB side) is omitted opposite said traversing hole. The PVB2 was holed and then assembled with the PET 20a already carrying the selective layer 2 and an AR overlayer 22.

The blind hole is alternatively produced on the FA side in order to house a film or a film stack and, on the face FB, at least one polymer film for protection of the PVB is retained.

The invention claimed is:

1. A laminated vehicle glazing for a vehicle, comprising:
a first glass sheet intended to be an exterior glazing with a first external main face F1 and a second internal main face F2,
a lamination interlayer made of polymer material with a main face FA oriented toward the second internal main face F2 and with a main face FB opposite to the main face FA, of given thickness E3,
a second glass or plastic sheet intended to be an interior glazing with a third main face F3, oriented toward the second internal main face F2, and a fourth internal main face F4
wherein:
the first glass sheet exhibits a content by weight of total iron oxide of at most 0.05%, the second glass or plastic sheet exhibits a traversing hole in a thickness of the second glass or plastic sheet, with a width W1 which is at least centimetric,
the laminated glazing comprises, under said traversing hole, on a side of the second internal main face F2, a safety element which is transparent at at least one working wavelength in the infrared region in a range extending from 800 nm to 1800 nm,
wherein the safety element comprises:
in configuration a), a first polymer film or a first stack of polymer films comprising a first polymer film and at least one second polymer film adhesively bonded to the first polymer film, the safety element exhibits a total thickness of the first polymer film or the first stack of polymer films of at least 50 µm, the first polymer film being adhesively bonded to the second internal main face F2 which is bare or coated with a functional coating, the lamination interlayer exhibiting a traversing interlayer hole in its thickness, opposite said traversing hole of the second glass or plastic sheet,
or
in configuration b), a second stack comprising the lamination interlayer and at least one first other polymer film adhesively bonded or in adhesive contact with the main face FB of the lamination interlayer which is bare or coated with a functional coating,
and wherein, opposite said traversing hole of the second glass or plastic sheet, the laminated glazing exhibits a total transmission of at least 80% at the working wavelength.

2. The laminated vehicle glazing as claimed in claim 1, wherein the safety element extends into a border zone of said traversing hole over at least 2 mm.

3. The laminated vehicle glazing as claimed in claim 1, wherein the second stack according to configuration b), or the first polymer film or the first stack of polymer films according to configuration a), is bonded to the third main face F3 in a border zone of said traversing hole of the second glass or plastic sheet over at least 2 mm.

4. The laminated vehicle glazing as claimed in claim 3, wherein, in configuration a), the first polymer film or the first stack of polymer films is adhesively bonded by an adhesive and/or the first polymer film is bonded by a polymer local rear band or the first stack of polymer films comprises a polymer local rear band that is in adhesive contact with the third main face F3 which is bare or coated with a coating,
in configuration b), the second stack comprises a polymer local rear band that is in adhesive contact with the third main face F3 which is bare or coated with a coating.

5. The laminated vehicle glazing as claimed in claim 4, wherein, under the third main face F3, the polymer local rear band is in adhesive contact with the lamination interlayer.

6. The laminated vehicle glazing as claimed in claim 4, wherein the polymer local rear band is made of poly(vinyl butyral) (PVB) containing less than 15% by weight of plasticizers.

7. The laminated vehicle glazing as claimed in claim 1, wherein the configuration a) or b) comprises at least one of the following functional polymer films transparent at the working wavelength: a selective filter film, safety or breakage-prevention film, a heating film, an antireflective or AR film, wherein, optionally, several of said selective filter, safety or breakage-prevention and antireflective or AR films are adhesively bonded by an adhesive.

8. The laminated vehicle glazing as claimed in claim 1, further comprising, under said traversing hole of the second glass or plastic sheet, on a side of the second internal main face F2, a selective filter which absorbs in the visible region and is transparent at at least one working wavelength in the infrared region in a range extending from 800 nm to 1800 nm, wherein, opposite said traversing hole of the second glass or plastic sheet, the laminated glazing exhibits a total transmission of at most 10%, 5%, 1% or 0.1% in the visible region.

9. The laminated vehicle glazing as claimed in claim 8, wherein the first polymer film or the first other polymer film or any other polymer film of configuration a) or b) forms part of the selective filter or forming said selective filter.

10. The laminated vehicle glazing as claimed in claim 1, wherein the first or second stack of polymer films comprises an antireflection or AR polymer film forming a free surface opposite said traversing hole of the second glass or plastic sheet.

11. The laminated vehicle glazing as claimed in claim 1, wherein at least one polymer film of the safety element according to configuration a) or b) comprises at least two functions chosen from the following: selective filter, heating, antireflective, breakage-prevention.

12. The vehicle glazing as claimed in claim 1, wherein, for configuration a), the functional coating is on the second internal main face F2 and is a selective filter or a heating layer, the first polymer film is an AR film, the first stack comprises lastly an AR film or an AR coating.

13. The laminated vehicle glazing as claimed in claim 1, wherein, for configuration a), the first polymer film is adhesively bonded to the second internal main face F2 by
   an adhesion layer, which is a pressure-sensitive adhesive PSA or hot-melt adhesive
or
   a polymer local front band that is in adhesive contact with the second internal main face F2 opposite said traversing hole of the second glass or plastic sheet.

14. The laminated vehicle glazing as claimed in claim 1, wherein, for configuration a), the first polymer film is adhesively bonded by a front band in adhesive contact with the second internal main face F2.

15. The laminated vehicle glazing as claimed in claim 1, wherein, under the third main face F3, a rear band and/or a front band is in adhesive contact with the lamination interlayer.

16. The laminated vehicle glazing as claimed in claim 15, wherein the front and/or rear band is made of poly(vinyl butyral) (PVB) containing less than 15% by weight of plasticizers.

17. The laminated vehicle glazing as claimed in claim 1 or 15, wherein, for configuration b), the second stack comprises one of the following sequences:
   polymer film/said lamination interlayer/selective filter layer/adhesive/AR film forming a free surface opposite the traversing hole,
   polymer film/said lamination interlayer/selective filter layer/adhesive/said first other polymer film forming a free surface opposite the traversing hole,
   polymer film/said lamination interlayer/said first other polymer film which is a selective filter
   functional coating being a selective filter/said lamination interlayer/said first other polymer film which is an AR film forming a free surface opposite the traversing hole,
   functional coating being selective filter or heating layer/said lamination interlayer/said other first polymer film forming a free surface opposite the traversing hole,
   one or more polymer films/said lamination interlayer/said other first polymer film forming a free surface opposite the traversing hole.

18. The laminated vehicle glazing as claimed in claim 1, wherein, for configuration b), the lamination interlayer is a PVB/polymer PET film, which is functional/PVB trilayer, and wherein the other first polymer film extends outside a zone of said traversing hole and is a portion of said functional film, the functional PET film optionally carrying a solar control layer which is absent opposite said traversing hole.

19. The laminated vehicle glazing as claimed in claim 1, wherein, for configuration b), the main face FA is in adhesive contact with the second internal main face F2 which is bare or coated with a functional coating, or the main face FA is bonded with one or more polymer films underlying the lamination interlayer.

20. The laminated vehicle glazing as claimed in claim 1, wherein, for configuration b), the main face FB exhibits a blind hole in its thickness opposite said traversing hole of the second glass or plastic sheet.

21. The laminated vehicle glazing as claimed in claim 1, wherein, for configuration b), the main face FA exhibits a blind hole in its thickness opposite said traversing hole of the second glass or plastic sheet and the second internal main face F2 is in adhesive contact or bonded with a polymer film underlying the main face FA.

22. The laminated vehicle glazing as claimed in claim 1, further comprising a plate adhesively bonded on the fourth main face F4 comprising a hole in line with said traversing hole.

23. The laminated vehicle glazing as claimed in claim 1, further comprising, in the traversing hole, an insert.

24. A vehicle comprising the laminated vehicle glazing as claimed in claim 1.

25. A device comprising:
   said laminated vehicle glazing as claimed in claim 1, and
   a system for infrared viewing at said working wavelength, positioned in a passenger compartment behind said laminated vehicle glazing so as to send and/or receive radiation after passing through the first glass sheet at a level of said traversing hole.

* * * * *